US012799011B2

(12) United States Patent
Okudera et al.

(10) Patent No.: US 12,799,011 B2
(45) Date of Patent: Nov. 17, 2026

(54) WATER TREATMENT APPARATUS, WATER TREATMENT SYSTEM, AND WATER TREATMENT METHOD

(71) Applicant: WOTA CORP., Tokyo (JP)

(72) Inventors: Shohei Okudera, Tokyo (JP); Ryo Yamada, Tokyo (JP); Yosuke Maeda, Tokyo (JP); Manabu Nishio, Tokyo (JP)

(73) Assignee: WOTA CORP., Tokyo (JP)

( * ) Notice: Subject to any disclaimer, the term of this patent is extended or adjusted under 35 U.S.C. 154(b) by 547 days.

(21) Appl. No.: 17/742,719

(22) Filed: May 12, 2022

(65) Prior Publication Data

US 2022/0274858 A1 Sep. 1, 2022

Related U.S. Application Data

(63) Continuation of application No. PCT/JP2020/042323, filed on Nov. 12, 2020.

(30) Foreign Application Priority Data

Nov. 14, 2019 (JP) ................................ 2019-205983

(51) Int. Cl.
*C02F 9/20* (2023.01)
*C02F 1/00* (2023.01)

(52) U.S. Cl.
CPC ................ *C02F 9/20* (2023.01); *C02F 1/002* (2013.01); *C02F 1/003* (2013.01); *C02F 1/008* (2013.01);

(Continued)

(58) Field of Classification Search
CPC ............................ C02F 2201/007; C02F 9/20
See application file for complete search history.

(56) References Cited

U.S. PATENT DOCUMENTS 5,845,052 A * 12/1998 Baba ......................... C02F 1/76 706/33
5,895,565 A * 4/1999 Steininger ............... C02F 1/008 210/85

(Continued)

FOREIGN PATENT DOCUMENTS

AU 2017388639 A1 * 8/2019 ............... H04Q 9/00
CN 109110843 A 1/2019

(Continued)

OTHER PUBLICATIONS

International Search Report (with English Translation) and Written Opinion (with English Translation) issued on Dec. 15, 2020 in corresponding International Patent Application No. PCT/JP2020/042323; 12 pages.

*Primary Examiner* — In Suk C Bullock
*Assistant Examiner* — Adam Adrien Germain
(74) *Attorney, Agent, or Firm* — HAUPTMAN HAM, LLP

(57) ABSTRACT

A water treatment apparatus includes a water receiver configured to receive an input of water; and an installation mechanism configured to include one or more slots in which a module for water treatment is installable. Among a plurality of types of modules available to be selected in accordance with a use of water treatment, at least one module includes a filter as a component, and the water treatment apparatus is configured to provide a water treatment function corresponding to the module to the water received at the water receiver by installing the module in one of the one or more slots.

9 Claims, 17 Drawing Sheets

(52) U.S. Cl.
CPC .. *C02F 2201/007* (2013.01); *C02F 2209/001* (2013.01); *C02F 2209/003* (2013.01); *C02F 2209/006* (2013.01); *C02F 2209/008* (2013.01)

(56) References Cited

U.S. PATENT DOCUMENTS

| | | | | |
|---|---|---|---|---|
| 5,925,240 | A * | 7/1999 | Wilkins | C02F 1/32 210/287 |
| 2006/0291839 | A1* | 12/2006 | Zoccolante | B01D 61/025 392/485 |
| 2007/0210236 | A1 | 9/2007 | Yungner et al. | |
| 2009/0314701 | A1 | 12/2009 | Jeong | |
| 2010/0292844 | A1* | 11/2010 | Wolf | C02F 9/00 700/271 |
| 2014/0091041 | A1 | 4/2014 | Nielsen | |
| 2014/0116870 | A1 | 5/2014 | Kamen et al. | |
| 2017/0107478 | A1 | 4/2017 | Harmon et al. | |
| 2018/0162761 | A1* | 6/2018 | Zhang | B01D 61/12 |
| 2018/0230024 | A1* | 8/2018 | Glynn | C02F 9/20 |
| 2019/0047889 | A1* | 2/2019 | Foster | C02F 9/20 |
| 2021/0063981 | A1 | 3/2021 | Kitagawa et al. | |

FOREIGN PATENT DOCUMENTS

| | | | | |
|---|---|---|---|---|
| EP | 3551310 | B1 | 6/2022 | |
| JP | 2000334439 | A | 12/2000 | |
| JP | 2001353497 | A | 12/2001 | |
| JP | 2002282839 | A | 10/2002 | |
| JP | 200460403 | A | 2/2004 | |
| JP | 2007-515005 | A | 6/2007 | |
| JP | 2010523324 | A | 7/2010 | |
| JP | 2012526657 | A | 11/2012 | |
| JP | 2018530324 | A | 10/2018 | |
| JP | 2021079305 | A | 5/2021 | |
| KR | 20190019346 | A * | 2/2019 | G06Q 50/04 |
| WO | WO-2018053304 | A1 * | 3/2018 | C02F 1/004 |
| WO | 2019059310 | A1 | 3/2019 | |

* cited by examiner

FIG. 7

202

Storage unit

281

Water treatment module database

| Module ID | Type/function | Size | Data that can be sensed |
|---|---|---|---|
| FL01 | Filter | 1 slot | Concentration, flow rate, ... |
| FL02 | Bacteria removal | 2 slots | Concentration, flow rate, ... |
| PW01 | Power supply (solar photovoltaic power generation) | 1 slot | Generated power amount, ... |
| HT01 | Water heater | 1 slot | Temperature, ... |
| GN01 | Water generator | 1 slot | Generated water amount, ... |
| · · · | · · · | · · · | · · · |

282

Water treatment apparatus database

| Pod ID | User ID | Pod location information | Slot usage | Designated use | Operation start date | Sensing data |
|---|---|---|---|---|---|---|
| #00000001 | #7E8F9A6D | (Px1 ,Py1 ) | SL01: FL01, SL02: FL02, · · · (SL01～SL16) | SL01～SL04: Dishwashing, CL05～CL08: Power supply, · · · | Dec. 1, 2019 | (SL01, T01, D01), (SL02, T01, D02), · · · |
| · · · | · · · | · · · | · · · | · · · | · · · | · · · |
| · · · | · · · | · · · | · · · | · · · | · · · | · · · |

283

User information database

| User ID | Used pod ID | Owned module | Used module | Schedule | · · · |
|---|---|---|---|---|---|
| #11AABB22 | #00000011 | FL01, FL02, FL03, · · · | FL01, PW01, · · · | SCL001, SCL002, · · · | · · · |
| · · · | · · · | · · · | · · · | · · · | · · · |
| · · · | · · · | · · · | · · · | · · · | · · · |

FIG. 15

284

| External environment information | | | | | |
|---|---|---|---|---|---|
| Environment ID (user ID, pod ID) | Parameters affecting demand for water in environment | | | Sensing data of water treatment facility | . . . |
| | Climatic conditions (weather, air temperature, humidity, wind velocity, ...) | Information on users who use water in environment (inflow and outflow of people, ...) | Information on water sources (flow rate of river, amount of groundwater, ...) | Gas sensor, tank, water quality, ... | . . . |
| . . . | . . . | . . . | . . . | . . . | . . . |
| . . . | . . . | . . . | . . . | . . . | . . . |

WATER TREATMENT APPARATUS, WATER TREATMENT SYSTEM, AND WATER TREATMENT METHOD

CROSS-REFERENCE TO RELATED APPLICATIONS

This application is based upon and claims the benefit of priority from the prior Japanese Patent Application No. 2019-205983, filed Nov. 14, 22019, and from PCT Patent Application No. PCT/JP2020/42323, filed Nov. 12, 2020 the entire contents of which are incorporated herein by reference.

FIELD

Embodiments described herein relate generally to a water treatment apparatus, a water treatment system, and a water treatment method.

BACKGROUND

Large-scale water treatment equipment is in operation to meet the demands for water in various places. For example, as equipment for drinking water treatment, predetermined devices such as a filtration device, a dust removal device, a sedimentation pond, an ozone contact layer, and an activated carbon adsorption pond are prepared to meet the demands for water in various places (the number of households, etc.), thereby performing treatment from water intake to purification. For example, various techniques such as sludge treatment are used in equipment for sewage treatment.

Such a water treatment system has been provided to local residents as a public service by local governments, such as municipalities, and the like. However, the cost of installing infrastructure tends to be large to operate a water treatment system with large-scale water treatment equipment.

In addition, water has a wide variety of uses. For example, some water is used for drinking, some for washing dishes after meals, and some for flushing toilets.

Therefore, when large-scale water treatment equipment is operated, it tends to be large equipment that is a combination of water treatment apparatuses so that it can be fit for various uses.

In addition, even if large-scale water treatment equipment is installed, it may not be able to meet a wide variety of demands for water.

Therefore, an object of the present disclosure is to provide a water treatment system that meets a wide variety of demands for water without incurring the infrastructure costs of large-scale water treatment equipment.

BRIEF DESCRIPTION OF THE DRAWINGS

FIG. 7 shows data structures of a water treatment module database 281, a water treatment apparatus database 282, and a user information database 283 stored in the server 20.

FIG. 15 shows a data structure of external environment information 284 in the second embodiment.

DETAILED DESCRIPTION

Figure 1:
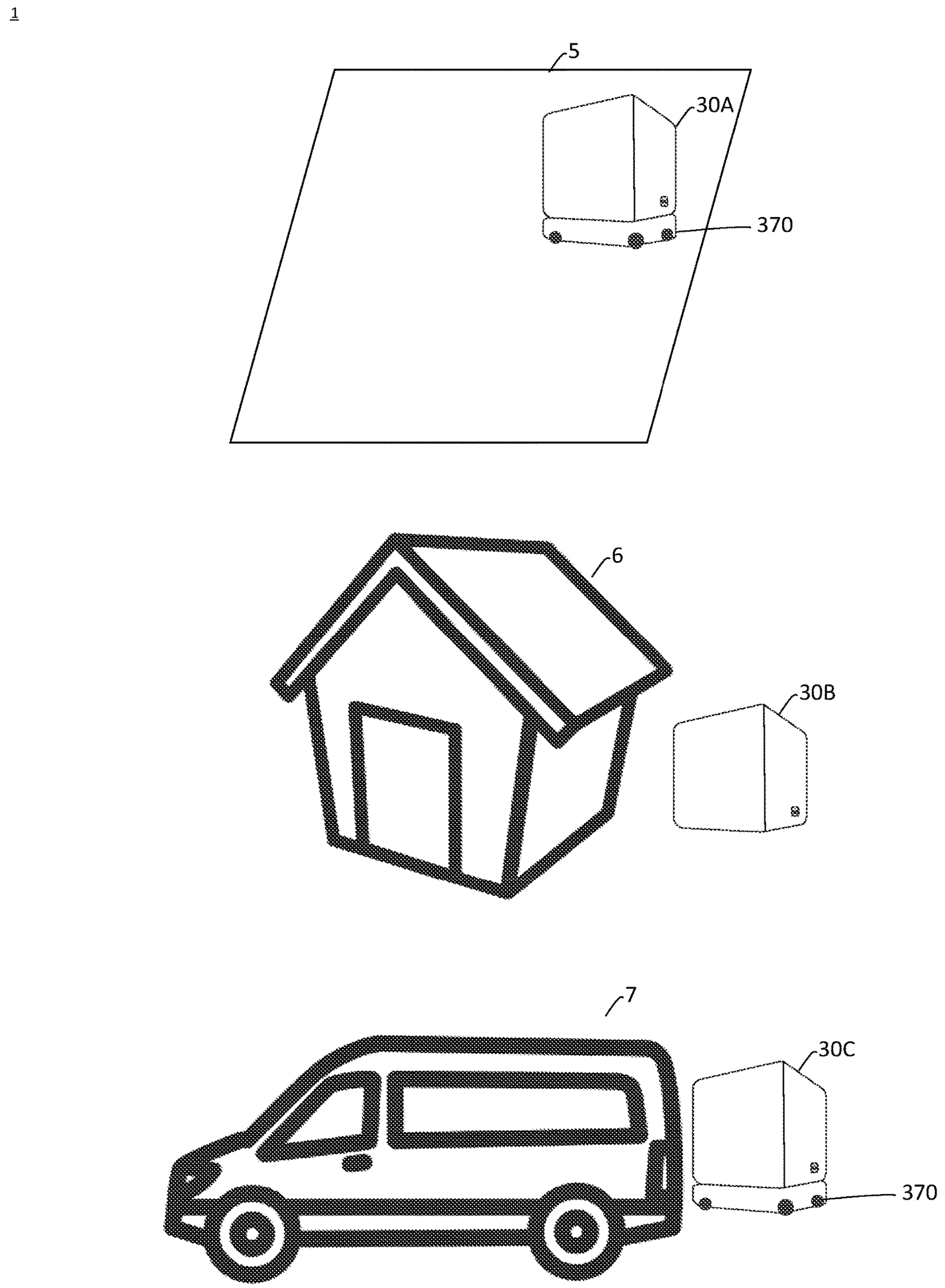
FIG. 1 shows an overview of a water treatment system 1.

In general, according to an embodiment, a water treatment apparatus is provided. The water treatment apparatus comprises: a water receiver configured to receive an input of water; and an installation mechanism configured to include one or more slots in which a module for water treatment is installable, wherein among a plurality of types of modules available to be selected in accordance with a use of water treatment, at least one module includes a filter as a component, and the water treatment apparatus is configured to provide a water treatment function corresponding to the module to the water received at the water receiver by installing the module in one of the one or more slots.

Hereinafter, embodiments of the present invention will be described with reference to the drawings. In the following description, identical parts are denoted by the same reference numeral. Their names and functions are also the same. Therefore, their detailed description will not be repeated.

Overview

In the following embodiment, a water treatment system 1 for providing a water source will be described.

Users use water for various purposes in their daily lives. For example, users drink drinking water to be rehydrated. Other uses of water include washing dirt attached to objects; for example, users use water to wash dishes after meals. In addition, users use water for showering, bathing, laundry, toilets, drink servers, room humidification, and the like.

First Embodiment

In the embodiment, a water treatment apparatus 30 capable of providing a water source by having a water treatment function will be described, and a water treatment system 1 realized by installing water treatment apparatuses 30 in various places will be described.

FIG. 1 shows an overview of the water treatment system 1. The water treatment system 1 includes water treatment apparatuses 30 (in the example of FIG. 1, water treatment apparatuses 30A, 30B, 30C are shown) installed in various places, and a server (not shown in FIG. 1) capable of communicating with these water treatment apparatuses 30. In the example shown, the water treatment apparatuses 30A and 30C each have a moving mechanism 370. The moving mechanism 370 has, for example, wheels and enables the water treatment apparatus 30 to travel by driving the wheels, or the like. The water treatment apparatus 30B does not have the moving mechanism 370 and does not have a self-traveling function.

The water treatment apparatuses 30 are installed in various places. For example, the water treatment apparatus 30A is installed on outdoor land 5. By installing the water treatment apparatus 30A on the outdoor land 5, water can be used outdoors for various purposes such as drinking, showering, and toilet use. For example, by the water treatment apparatus 30A providing a water purification function, water can be purified to allow the user to drink water.

For example, the water treatment apparatus 30B is installed to provide a building 6 with a water treatment function. The water treatment apparatus 30B is installed inside or outside the building 6.

For example, the water treatment apparatus 30C is installed to provide a water treatment function in a mobile body 7 such as an automobile. The water treatment apparatus 30C is mounted inside or outside the mobile body 7. For example, some mobile bodies 7, such as a camper, are equipped with various facilities that use water, such as a kitchen for cooking and a toilet. The water treatment apparatus 30C provides a water treatment function in accordance with various uses of water used in the mobile body 7.

Although FIG. 1 shows an example in which the water treatment apparatus 30 is used as a single independent apparatus, a water treatment function may be provided by incorporating the function of the water treatment apparatus 30 into equipment in a building or the like. For example, the water treatment apparatus 30 may be incorporated into a washing machine, a sink, a water purifier, a shower room, a bathroom, a toilet, a bathtub, a humidifier, a dehumidifier, an air conditioner, or the like in a building or the like. As will be described later, the water treatment apparatus 30 is provided with a water treatment module 40 to provide a water treatment function. A water treatment function may be provided to the user by incorporating a combination of water treatment modules 40 into equipment in a building or the like.

Each water treatment apparatus 30 transmits, to a server, a water treatment function it offers and a history of water treatment performed. The server can thereby accumulate information on the demand for water treatment in the environment where each water treatment apparatus 30 is installed.

<Overall Configuration Diagram of System>

Figure 2:
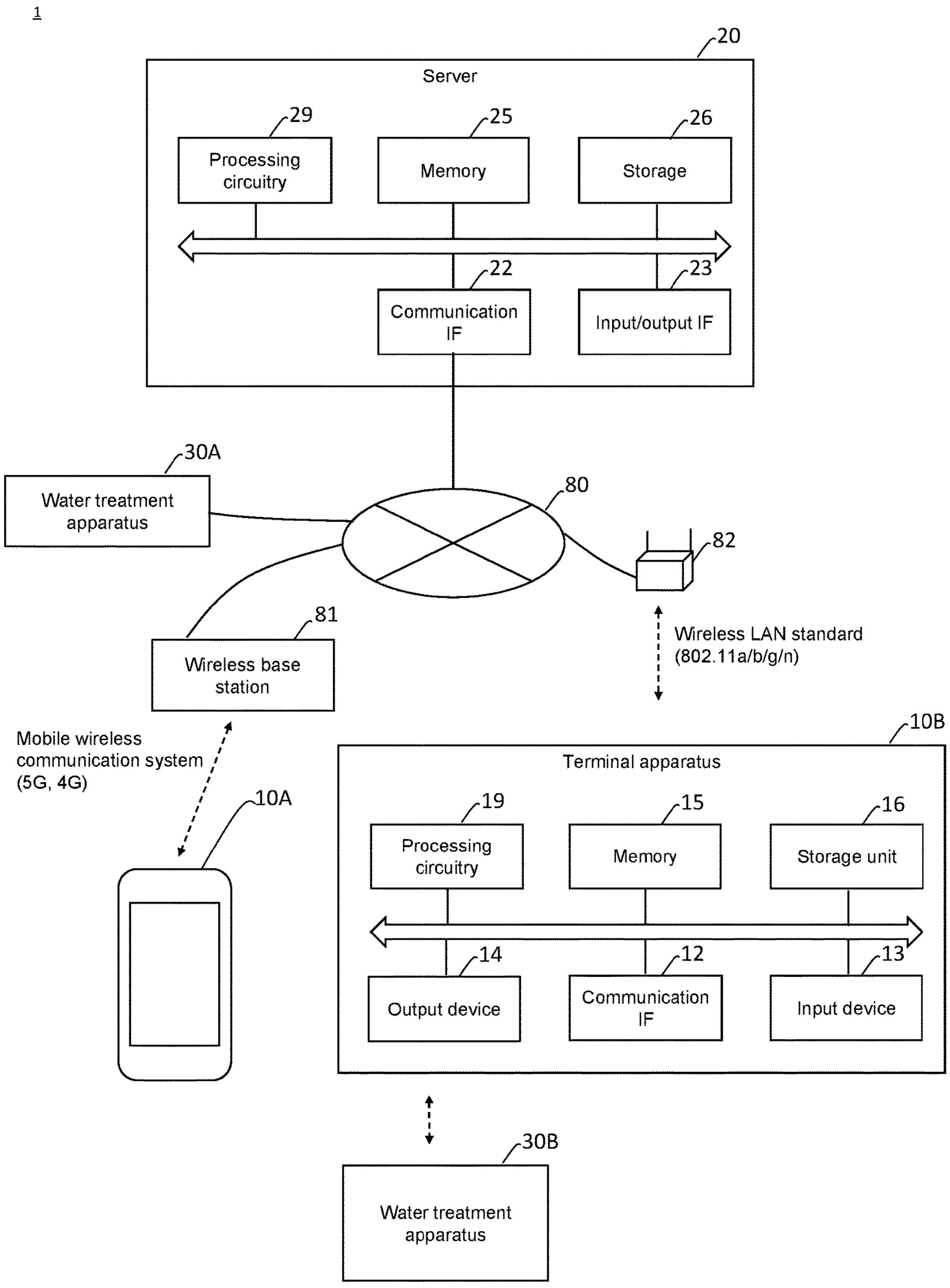
FIG. 2 shows an overall configuration of the water treatment system 1.

FIG. 2 shows an overall configuration of the water treatment system 1.

As shown in FIG. 2, the water treatment system 1 includes a terminal apparatus 10 (in the example shown, a terminal apparatus 10A and a terminal apparatus 10B are shown), a server 20, and a water treatment apparatus 30 (in the example shown, a water treatment apparatus 30A and a water treatment apparatus 30B are shown). The terminal apparatus 10, the server 20, and the water treatment apparatus 30 are connected to communicate via a network 80. As shown in the figure, the water treatment apparatus 30 (water treatment apparatus 30B) may communicate with the server 20 via the terminal apparatus 10 (terminal apparatus 10B).

The terminal apparatus 10 is an apparatus operated by each user. The terminal apparatus 10 is realized by a mobile terminal or the like, such as a smartphone or a tablet, compatible with a mobile communication system. Alternatively, the terminal apparatus 10 may be, for example, a stationary personal computer (PC) or a laptop PC. As shown as the terminal apparatus 10B in FIG. 2, the terminal apparatus 10 includes a communication interface (IF) 12, an input device 13, an output device 14, a memory 15, a storage unit 16, and processing circuitry 19. The server 20 includes a communication IF 22, an input/output IF 23, a memory 25, a storage 26, and processing circuitry 29.

The terminal apparatus 10 is communicatively connected to the server 20 via the network 80. The terminal apparatus 10 is connected to the network 80 by communicating with a wireless base station 81 compatible with communication standards such as 5G and Long Term Evolution (LTE), and a communication device, such as a wireless local area network (LAN) router 82, compatible with wireless LAN standards such as IEEE 802.11.

The communication IF 12 is an interface for the terminal apparatus 10 to input and output signals for communication with an external apparatus.

The input device 13 is an input device (such as a touch panel, a touch pad, a pointing device such as a mouse, or a keyboard) for receiving an input operation from the user.

The output device 14 is an output device (such as a display, a speaker, or a vibrator) for presenting information to the user.

The memory 15 is used to temporarily store a program, data to be processed by the program, etc., and the like, and is a volatile memory such as a dynamic random access memory (DRAM).

The storage unit 16 is a storage device for storing data, and is, for example, a flash memory or a hard disc drive (HDD).

The processing circuitry 19 is hardware for executing an instruction set described in a program, and is composed of an arithmetic unit, a register, a peripheral circuit, and the like.

The server 20 acquires a history of water treatment in each water treatment apparatus 30 and holds it as a database. The server 20 predicts a demand for water treatment based on the data accumulated in the database.

The communication IF 22 is an interface for the server 20 to input and output signals for communication with an external apparatus.

The input/output IF 23 functions as an interface with an input device for receiving an input operation from the user and an output device for presenting information to the user.

The memory 25 is used to temporarily store a program, data to be processed by the program, etc., and the like, and is a volatile memory such as a dynamic random access memory (DRAM).

The storage 26 is a storage device for storing data, and is, for example, a flash memory or a hard disc drive (HDD).

The processing circuitry 29 is hardware for executing an instruction set described in a program, and is composed of an arithmetic unit, a register, a peripheral circuit, and the like.

Next, each apparatus constituting the water treatment system 1 will be described.

<Configuration of Water Treatment Apparatus 30>

First, the water treatment apparatus 30 constituting the water treatment system 1 will be described.

Figure 3:
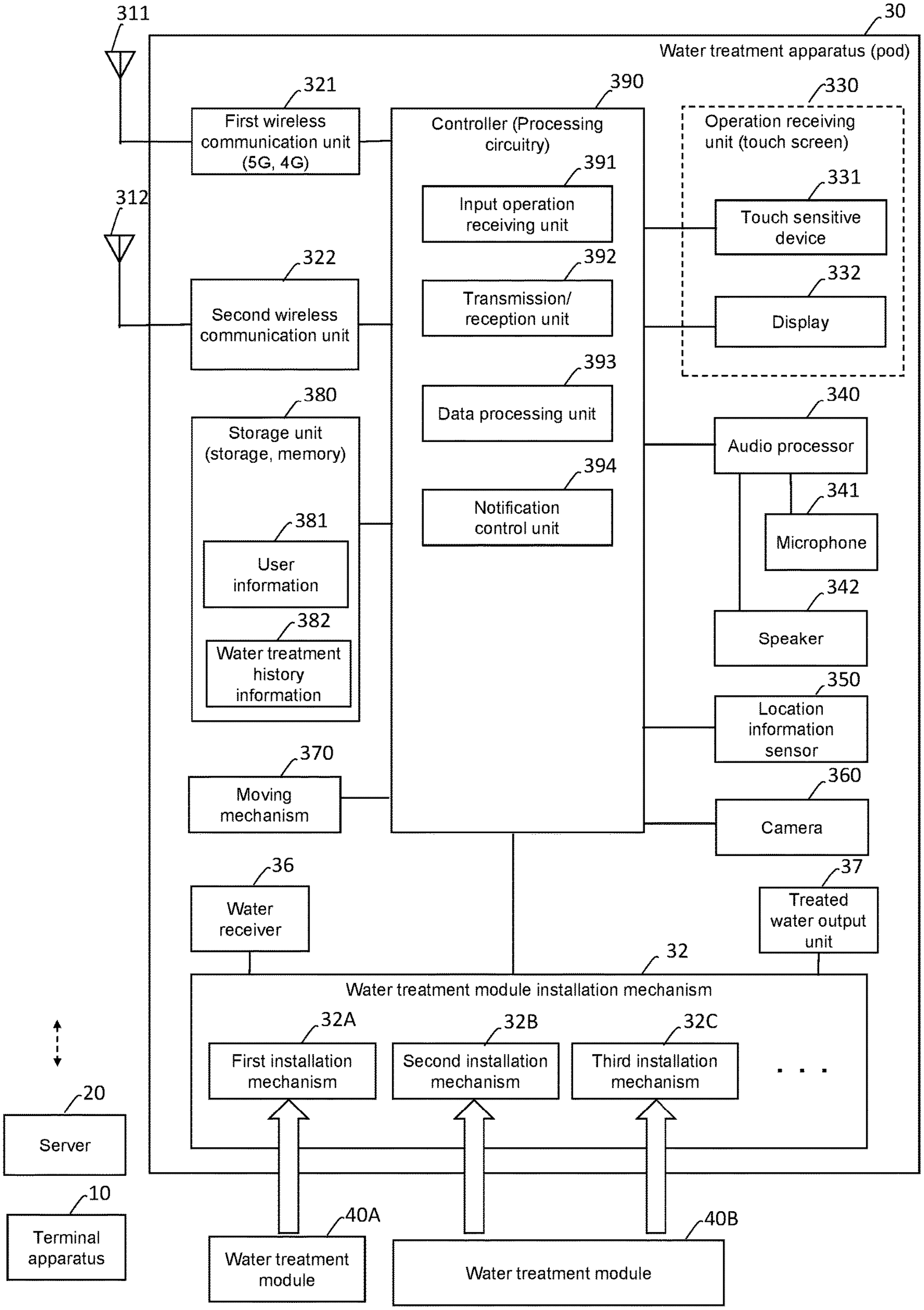
FIG. 3 is a block diagram showing a configuration of a water treatment apparatus

FIG. 3 is a block diagram showing a configuration of the water treatment apparatus 30. As shown in FIG. 3, the water treatment apparatus 30 includes a water treatment module installation mechanism 32. The water treatment module installation mechanism 32 includes a plurality of installation mechanisms (installation mechanisms 32A, 32B, 33C, . . . (slots 32A, 32B, . . . )).

The installation mechanisms are mechanisms for receiving installation of water treatment modules 40. In the example shown, water treatment modules 40A and 40B are shown as the water treatment modules 40. The water treatment apparatus 30 includes a water receiving unit 36 (water receiver) for supplying the water treatment module installation mechanism 32 with water to be treated, and a treated water output unit 37 for outputting, to the outside, water treated by each water treatment module 40 installed in the water treatment module installation mechanism 32. The water receiving unit 36 receives water supply, for example, from the outside of the water treatment apparatus 30 by means of a pump or the like. The treated water output unit 37 outputs water treated by the water treatment modules 40 to the outside of the water treatment apparatus 30. Drain water after the output water has been used by the user can be used as an input to the water receiving unit 36.

Figure 4A:
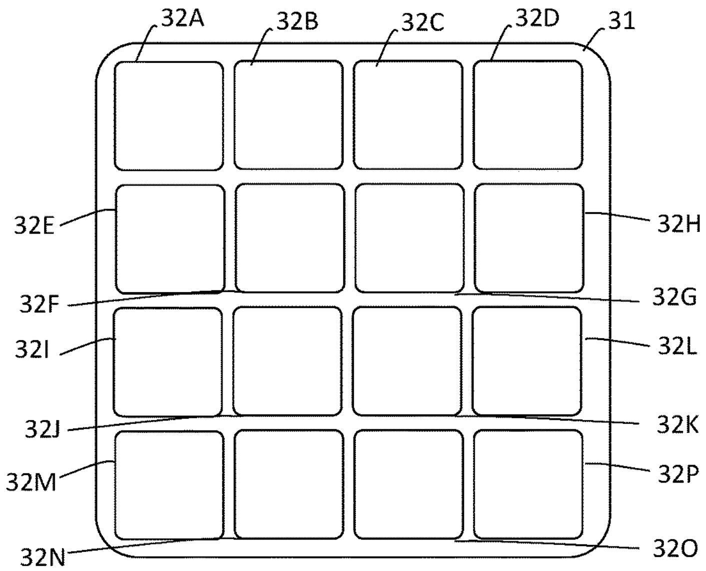
FIG. 4A shows an example of the front of an insertion surface 31 for receiving installation of water treatment modules 40 in the water treatment apparatus 30.
Figure 4B:
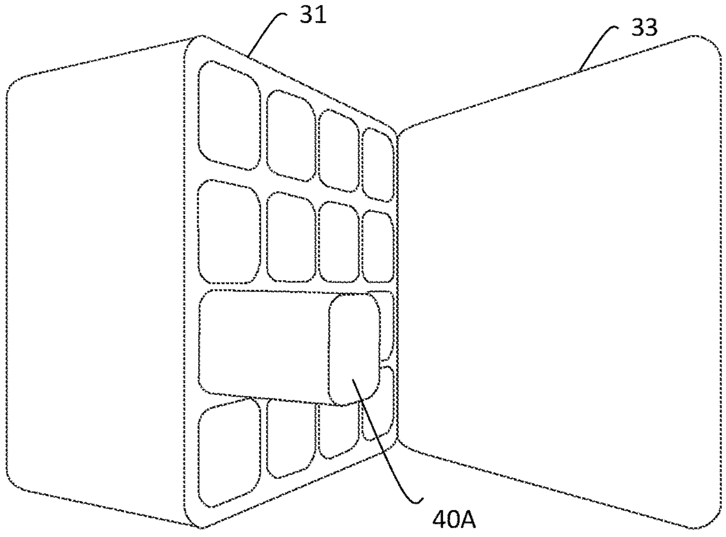
FIG. 4B shows an example of the appearance of the insertion surface 31 when viewed at an angle.
Figure 4C:
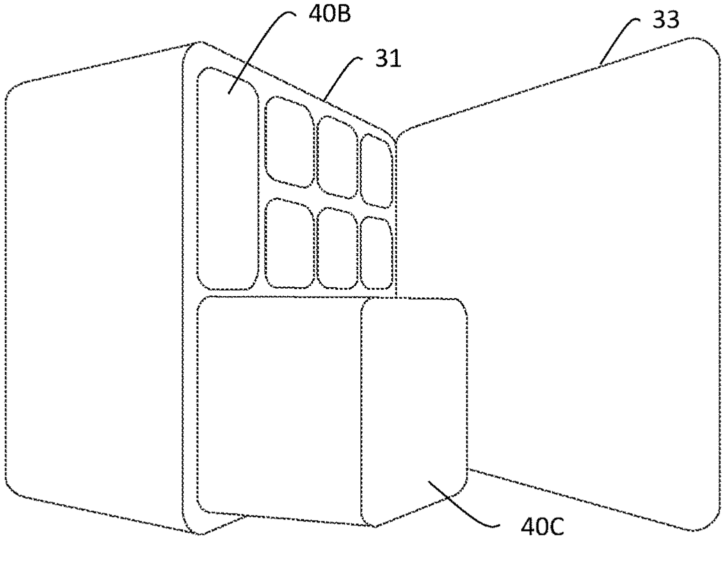
FIG. 4C shows another example for installing water treatment modules 40 in a plurality of installation mechanisms.

FIG. 4 shows an example of the appearance of a plurality of installation mechanisms for receiving installation of water treatment module 40 in the water treatment apparatus 30. FIG. 4A shows the front of an insertion surface 31 for receiving installation of water treatment modules 40 in the water treatment apparatus 30. FIG. 4B shows the appearance of the insertion surface 31 when viewed at an angle. FIG. 4C shows another example for installing water treatment modules 40 in a plurality of installation mechanisms.

As shown in FIG. 4A, the water treatment apparatus 30 includes a plurality of installation mechanisms (installation mechanisms 32A, 32B, 32C, . . . (slots 32A, 32B, . . . )) on the insertion surface 31. In the example shown, each of the installation mechanisms has an equivalent structure so that a water treatment module 40 can be connected thereto. The water treatment module 40 is prepared according to its functions, but has a size corresponding to the structures of the installation mechanisms.

By installing a water treatment module 40 having a certain volume in each installation mechanism, the installation mechanism provides the function of the water treatment module 40 to the user. For example, each installation mechanism has a connection portion for connecting to the water treatment module 40. The connection portion includes, for example, a pump mechanism for supplying water to be treated to the water treatment module 40 and a discharge mechanism for discharging treated water which has been treated by the water treatment module 40. The water treatment module 40 has a connection portion at an end for connecting to an installation mechanism.

Accordingly, the installation mechanism and the water treatment module 40 can be connected to each other by the connection portion, thereby providing the water treatment apparatus 30 with the function of each water treatment module 40.

As shown in FIG. 4B, the water treatment apparatus 30 has a door 33 for covering the insertion surface 31. The water treatment apparatus 30 is about to receive installation of the water treatment module 40A by an installation mechanism. By inserting the water treatment module 40A into the insertion surface 31, the water treatment module 40 can be installed in the installation mechanism.

In the example shown, the water treatment apparatus 30 has 16 installation mechanisms (installation mechanisms 32A, 32B, . . . , and 32P (slots 32A, 32B, . . . , and 32P)) so that a water treatment module 40 having a predetermined size can be installed in the insertion surface 31. As shown in FIG. 4B, the water treatment module 40 may have an appearance that can be identified by the user (e.g., color of the water treatment module 40) depending on the function and performance.

In the example of FIG. 4B, the size of the water treatment module 40 is equal to a predetermined unit, but the water treatment module 40 may need to be larger than the predetermined unit depending on the water treatment function required for the water treatment module 40.

In FIG. 4C, a water treatment module 40 larger than that in the example of FIG. 4B can be installed in the water treatment apparatus 30. In FIG. 4C, a water treatment module 40B having a size twice as large as the unit on the insertion surface 31 is shown. Further, a water treatment system 40C having a size four times as large as the unit on the insertion surface 31 may be installed in the water treatment apparatus 30.

Each water treatment module 40 includes a component, such as a filter, having a function for water treatment. In addition to the component having the function for water treatment, each water treatment module 40 includes a component having a function of supplying energy for operating the water treatment device 30, such as a function of supplying electric power. As described above, by mounting water treatment modules 40 in the water treatment apparatus 30, the water treatment apparatus 30 provides the user of the water treatment apparatus 30 with the functions of the mounted water treatment modules 40.

As described above, the water treatment apparatus 30 has a configuration that allows water treatment modules 40 to be installed; therefore, the water treatment apparatus 30 can also be regarded as a pod capable of accommodating water treatment modules 40.

Referring back to FIG. 3, the description of the configuration of the water treatment apparatus 30 will be continued.

The water treatment apparatus 30 has a configuration for communicating with an external apparatus and a configuration for processing data. The water treatment apparatus 30 includes a plurality of antennas (an antenna 311 and an antenna 312), wireless communication units (a first wireless communication unit 321 and a second wireless communication unit 322) corresponding to the respective antennas, an operation receiving unit 330 (including a touch sensitive device 331 and a display 332), an audio processor 340, a microphone 341, a speaker 342, a location information sensor 350, a camera 360, a moving mechanism 370, a storage unit 380, and a control unit 390.

The water treatment apparatus 30 also has functions and configurations not particularly shown in FIG. 3 (such as a circuit connected to a power supply to be supplied with electric power, a battery for holding electric power, and a power supply circuit for controlling supply of electric power from the battery to each circuit). As shown in FIG. 3, the blocks included in the water treatment apparatus 30 are electrically connected by buses or the like.

The water treatment apparatus 30 does not need to have all the configurations shown in FIG. 3, but may have some of the configurations. For example, the water treatment apparatus 30 may not have a part of the configuration of the terminal apparatus 10 capable of communicating with the water treatment apparatus 30. For example, the water treatment apparatus 30 may not have the configuration for notifying the user, such as the audio processor 340, the microphone 341, and the speaker 342. Further, the water treatment apparatus 30 may not have a configuration, such as the location information sensor 350 or the camera 360, sensing of which can also be performed in the terminal apparatus 10. Further, there may be a case where the water treatment apparatus 30 does not need to have antennas and wireless communication units according to a plurality of communication standards, such as the case where the water treatment apparatus 30 only need to be compatible with either a mobile communication system or short-range wireless communication.

The antenna 311 radiates a signal emitted from the water treatment apparatus 30 as a radio wave. The antenna 311 also receives a radio wave from the space and provides the received signal to the first wireless communication unit 321.

The antenna 312 radiates a signal emitted from the water treatment apparatus 30 as a radio wave. The antenna 312 also receives a radio wave from the space and provides the received signal to the second wireless communication unit 322.

The first wireless communication unit 321 performs modulation/demodulation processing or the like for transmitting and receiving a signal through the antenna 311 to allow the water treatment apparatus 30 to communicate with another wireless apparatus. The second wireless communication unit 322 performs modulation/demodulation processing or the like for transmitting and receiving a signal through the antenna 312 to allow the water treatment apparatus 30 to communicate with another wireless apparatus. The first wireless communication unit 321 and the second wireless communication unit 322 are communication modules each including a tuner, a received signal strength indicator (RSSI) calculation circuit, a cyclic redundancy check (CRC) calculation circuit, a high frequency circuit, and the like. The first wireless communication unit 321 and the second wireless communication unit 322 perform a modulation/demodulation or a frequency conversion of a radio signal transmitted or received by the water treatment apparatus 30 and provides the received signal to the control unit 390.

The operation receiving unit 330 has a mechanism for receiving an input operation by the user. Specifically, the operation receiving unit 330 is configured as a touch screen and includes a touch sensitive device 331 and a display 332. The touch sensitive device 331 receives an input operation by the user of the water treatment apparatus 30. The touch sensitive device 331 detects a contact position of the user on the touch panel by using, for example, a capacitive touch panel. The touch sensitive device 331 outputs a signal indicating the contact position of the user detected by the touch panel to the control unit 390 as an input operation. The operation receiving unit 330 may receive an input operation by a physically deformable mechanism such as a button.

The display 332 displays data such as an image, a moving image, and text in accordance with control of the control unit 390. The display 332 is realized by, for example, a liquid crystal display (LCD), an organic electro-luminescence (EL) display, an electronic paper, or the like.

The audio processor 340 modulates and demodulates an audio signal. The audio processor 340 modulates a signal provided by the microphone 341 and provides the modulated signal to the control unit 390. The audio processor 340 also provides an audio signal to the speaker 342. The audio processor 340 is realized by, for example, processing circuitry for audio processing. The microphone 341 receives an audio input and provides an audio signal corresponding to the audio input to the audio processor 340. The speaker 342 converts the audio signal provided from the audio processor 340 into audio and outputs the audio to the outside of the water treatment apparatus 30.

The location information sensor 350 is a sensor for detecting the location of the water treatment apparatus 30, and is, for example, a global positioning system (GPS) module. The GPS module is a receiver device used in a satellite positioning system. The satellite positioning system receives signals from at least three or four satellites, and detects the current location of the water treatment apparatus 30 equipped with the GPS module based on the received signals. The location detected by the GPS module can be used, for example, when the server 20 is notified of location information of the water treatment apparatus 30.

The camera 360 is a device for receiving light by a light receiving element and outputting it as a captured image. The camera 360 is, for example, a depth camera capable of detecting a distance from the camera 360 to an object to be imaged.

The storage unit 380 is composed of, for example, a flash memory or the like, and stores data and programs used by the water treatment apparatus 30. In one situation, the storage unit 380 stores user information 381 and water treatment history information 382.

The user information 381 is information on a user who is provided with a water treatment function by the water treatment apparatus 30. The information on the user includes information for identifying the user, information on water treatment modules 40 used by the user, information on water treatment modules 40 owned by the user, and the like.

The water treatment history information 382 is information indicating results of sensing by various sensors included in the water treatment apparatus 30. For example, the water treatment history information 382 holds a history of water treatment performed in each water treatment module 40 installed in the water treatment module installation mechanism 32.

The control unit 390 controls the operation of the water treatment apparatus 30 by reading a program stored in the storage unit 380 and executing instructions included in the program. The controller 390 is, for example, an application processor (processing circuitry). The control unit 390 operates in accordance with the program to perform the functions as the input operation receiving unit 391, a transmission/reception unit 392, a data processing unit 393, and a notification control unit 394.

The input operation receiving unit 391 performs a process of receiving an input operation by the user on an input device such as the touch sensitive device 331. The input operation receiving unit 391 determines the type of the operation, such as whether the user's operation is a flick operation, a tap operation, or a drag (swipe) operation, based on information on the coordinates at which the user touches the touch sensitive device 331 with a finger or the like. Further, the input operation receiving unit 391 acquires information on a location or the like designated by the user with a pointing device or the like on the display 332.

The transmission/reception unit 392 performs a process by which the water treatment apparatus 30 transmits and receives data to and from an external apparatus such as the server 20 in accordance with a communication protocol.

The data processing unit 393 performs a process of performing an operation in accordance with the program on data received by the water treatment apparatus 30, and outputting an operation result to a memory or the like. For example, the data processing unit 393 performs a process of causing the water treatment history information 382 to hold a history of water treatment performed by a water treatment module 40 in the water treatment apparatus 30, a process of transmitting the information held in the water treatment history information 382 to the server 20, and the like.

The notification control unit 394 performs a process of notifying the user of information. The notification control unit 394 performs, for example, a process of causing the display 332 to display a display image, a process of causing the speaker 342 to output audio, and a process of generating vibration on the camera 360.

<Functional Configuration of Server 20>

Next, a configuration of the server 20 will be described.

Figure 5:
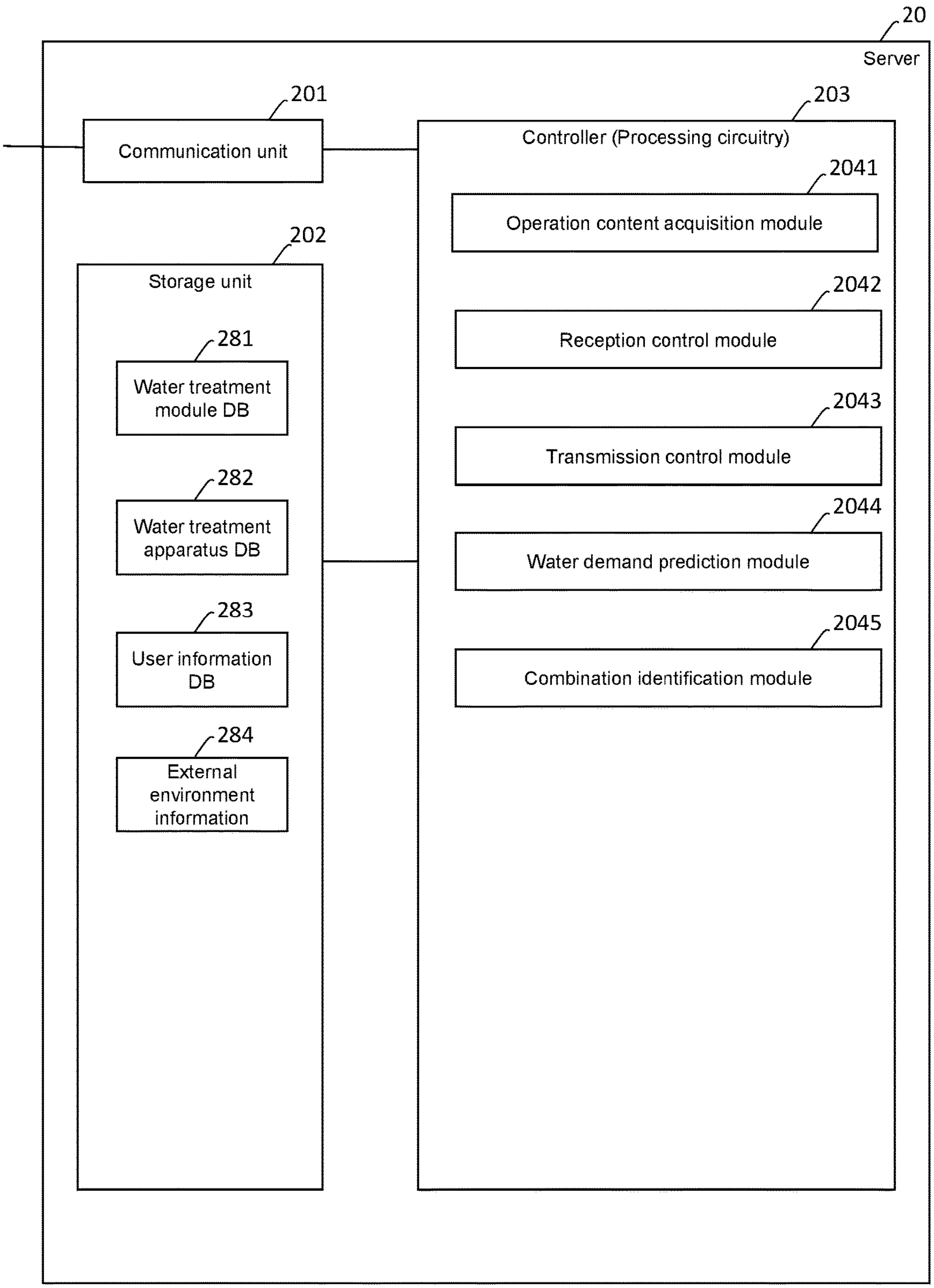
FIG. 5 shows a functional configuration of a server 20.

FIG. 5 shows a functional configuration of the server 20. As shown in FIG. 5, the server 20 performs functions as a communication unit 201, a storage unit 202, and a control unit 203.

The communication unit 201 performs a process by which the server 20 communicates with an external apparatus (for example, the terminal apparatus 10 or the water treatment apparatus 30).

The storage unit 202 stores data and programs used by the server 20. The storage unit 202 stores a water treatment module database 281, a water treatment apparatus database 282, a user information database 283, and external environment information 284.

The water treatment module database 281 is a database on specifications of water treatment modules 40. Details will be described later.

The water treatment apparatus database 282 is a database on the setting of the water treatment apparatus 30 and the history of the user's use of the water treatment apparatus 30. Details will be described later.

The user information database 283 is a database for holding information on each user who uses the water treatment apparatus 30. Details will be described later.

The external environment information 284 is information on an environment in which the water treatment apparatus 30 is installed. For example, the server 20 acquires parameters affecting the demand for water for the place where the water treatment apparatus 30 is installed and causes the external environment information 284 to accumulate the parameters. For example, the parameters affecting the demand for water include data on climatic conditions around the place where the water treatment apparatus 30 is installed (such as weather, temperature, humidity, and wind velocity), data on users who use water (such as human inflow and outflow), data on local water sources (such as flow rate of river and amount of groundwater), and time-series data of other information.

The controller 203 performs the functions shown as various modules by the processing circuitry of the server 20 performing processing in accordance with programs.

An operation content acquisition module 2041 acquires the content of a user's operation when the server 20 receives an input of information from the user of the terminal apparatus 10 or the like. For example, when the server 20 presents a screen by a browser of the terminal apparatus 10 and receives a user's operation, the operation content acquisition module 2041 acquires the content of the user's operation.

The reception control module 2042 controls a process by which the server 20 receives a signal from an external apparatus in accordance with a communication protocol.

The transmission control module 2043 controls a process by which the server 20 transmits a signal to an external apparatus in accordance with a communication protocol.

The water demand prediction module 2044 predicts a demand for water in each place. The water demand prediction module predicts the use of water required at the location where the water treatment apparatus 30 is installed and the amount of water demanded, based on the contents of each database stored in the storage unit 202.

For example, the water demand prediction module 2044 predicts the use of water and the amount of water demanded in each place based on the actual results of water treatment performed by the water treatment apparatuses 30 installed in various places based on the water treatment apparatus database 282. For example, by creating a trained model based on time-series data of the actual results of water treatment by water treatment apparatuses 30 accumulated in the water treatment apparatus database 282, the water demand prediction module 2044 can predict a demand for water based on the trained model.

For example, the water demand prediction module 2044 may predict the demand for water in each place based on the information on the environments of various places indicated in the external environment information 284. By creating a trained model based on time-series data of information on the environments of various places and the actual results of water treatment performed by water treatment apparatuses 30 installed in various places, the water demand prediction module 2044 can predict a demand for water based on a prediction result of information on the environment of the place and the trained model.

A combination identification module 2045 identifies a combination of water treatment modules 40 to be installed in the water treatment apparatus 30. In accordance with the use designated by the user, the combination identification module 2045 identifies a combination of water treatment modules 40 to be suitable for the use. Alternatively, in accordance with a prediction result of the demand for water by the water demand prediction module 2044 instead of the user's designation, the combination identification module 2045 identifies a combination of water treatment modules 40 to be suitable for the demand.

<Configuration of Terminal Apparatus 10>

Next, a configuration of the terminal apparatus 10 will be described.

Figure 6:
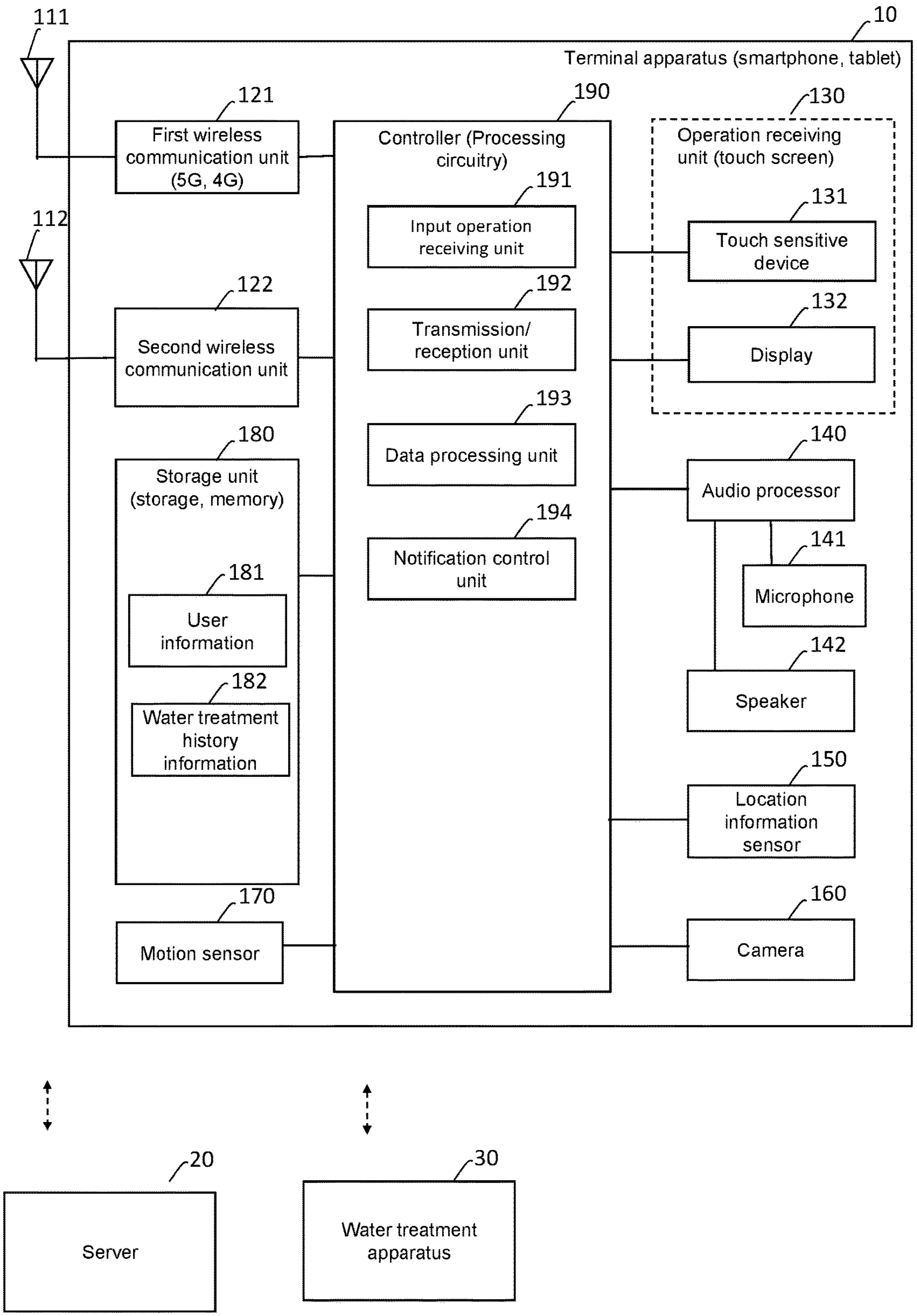
FIG. 6 is a block diagram showing a configuration of a terminal apparatus 10.

FIG. 6 is a block diagram showing a configuration of the terminal apparatus 10. As shown in FIG. 6, the terminal apparatus 10 includes a plurality of antennas (an antenna 111 and an antenna 112), wireless communication units (a first wireless communication unit 121 and a second wireless communication unit 122) corresponding to the respective antennas, an operation receiving unit 130 (including a touch sensitive device 131 and a display 132), an audio processor 140, a microphone 141, a speaker 142, a location information sensor 150, a camera 160, a storage unit 180, and a control unit 190.

Of the configurations of the terminal apparatus 10, the descriptions of the configurations equivalent to those of the water treatment apparatus 30 are not repeated as being similar to those of the water treatment apparatus 30, that is, the descriptions of the functions of the antennas (111, 112) the wireless communication units (first wireless communication unit 121, second wireless communication unit 122), the operation receiving unit 130, the touch sensitive device 131, the display 132, the audio processor 140, the microphone 141, the speaker 142, the location information sensor 150, and the camera 160 of the terminal apparatus 10, which are equivalent to the antennas (311, 312), the wireless communication units (first wireless communication unit 321 and second wireless communication unit 322), the operation receiving unit 330, the touch sensitive device 331, the display 332, and the audio processor 340, the microphone 341, the speaker 342, the location information sensor 350, and the camera 360 of the water treatment device 30, are not repeated. The location information sensor 150 is a sensor for detecting the location of the terminal apparatus 10.

The motion sensor 170 is composed of an acceleration sensor and an angular velocity sensor, and outputs sensing data relating to the motion of the terminal apparatus 10. Based on the sensing data, the terminal apparatus 10 detects the inclination of the terminal apparatus 10, the terminal apparatus 10 being shaken, and the like.

The storage unit 180 is composed of, for example, a flash memory or the like, and stores data and programs used by the terminal apparatus 10. In one situation, the storage unit 180 stores user information 181 and water treatment history information 182.

The user information 181 is information on the user who uses the water treatment apparatus 30. The information on the user includes information for identifying the user, information on water treatment modules 40 used by the user, information on water treatment modules 40 owned by the user, and the like.

The water treatment history information 182 is information indicating results of sensing by various sensors included in the water treatment apparatus 30. The water treatment history information 182 holds a history of water treatment performed by the water treatment apparatus 30 in each water treatment module 40 installed in the water treatment module installation mechanism 32.

The control unit 190 controls the operation of the terminal apparatus 10 by reading a program stored in the storage unit 180 and executing instructions included in the program. The controller 190 is, for example, an application processor (processing circuitry). The controller 190 operates in accordance with the program to perform the functions as an input operation receiving unit 191, a transmission/reception unit 192, a data processing unit 193, and a notification control unit 194.

The input operation receiving unit 191 performs a process of receiving an input operation by the user on an input device such as the touch sensitive device 131. The input operation receiving unit 191 determines the type of the operation, such as whether the user's operation is a flick operation, a tap operation, or a drag (swipe) operation, based on information on the coordinates at which the user touches the touch sensitive device 131 with a finger or the like.

The transmission/reception unit 192 performs a process by which the terminal apparatus 10 transmits and receives data to and from an external apparatus such as the server 20 in accordance with a communication protocol.

The data processing unit 193 performs a process of performing an operation on data received by the terminal apparatus 10 in accordance with a program, and outputting an operation result to a memory or the like. For example, the data processing unit 193 performs a process of acquiring from the water treatment apparatus 30 the actual results of water treatment performed in the water treatment apparatus 30 (sensing results in the water treatment apparatus 30) and transmitting the actual results to the server 20, and a process of presenting, by the display 132 or the like, a combination of water treatment modules 40 to be installed in the water treatment apparatus 30 to the user of the terminal apparatus 10.

The notification control unit 194 performs a process of causing the display 132 to display a display image, a process of causing the speaker 142 to output audio, and a process of generating vibration on the camera 160.

<Data Structure>

FIG. 7 shows data structures of the water treatment module database 281, the water treatment apparatus database 282, and the user information database 283 stored in the server 20.

As shown in FIG. 7, each record of the water treatment module database 281 includes an item "module identification information (ID)", an item "type/function", an item "size", and an item "data that can be sensed".

The item "module identification information (ID)" is information for identifying each of multiple types of water treatment module 40.

The item "type/function" indicates the type into which the water treatment module 40 is classified and the function performed by the water treatment module 40.

(i) A type of water treatment module 40 has a function of performing water treatment on inflowing water. For example, the type of water treatment module 40 includes a module that provides a function of removing substances larger than a predetermined size by a filter, a module that provides a function of removing microorganisms (bacteria) by an optical method (such as ultraviolet irradiation) or a chemical method, and the like.

(ii) A type of water treatment module 40 has a function of providing an energy source for operating the water treatment apparatus 30. For example, the type of water treatment module 40 includes a module provided with a solar cell or the like to provide a power supply function for operating the water treatment apparatus 30. Accordingly, such a water treatment module 40 supplies electric power to the water treatment apparatus 30 to make the water treatment apparatus 30 perform a water treatment function.

(iii) A type of water treatment module 40 provides water of properties required by the user. For example, the type of water treatment module 40 includes a module that provides a water heating function or cooling function when the user has a demand for using hot water or cold water for showering or drinking, and a module that provides a function of generating moisture from the air.

The item "size" indicates the size occupied by a water treatment module 40 when it is installed in the water treatment apparatus 30. In the present embodiment, as described with reference to FIG. 4 and the like, the water treatment apparatus 30 has a plurality of installation mechanisms. The size of each water treatment module 40 may be specified in the item "size" with each of these installation mechanisms used as a slot as shown in the example of FIG. 4.

For example, a water treatment module whose item "module identification information (ID)" is "FL01" occupies one slot of the slots of the water treatment apparatus 30 when being installed in the water treatment apparatus 30 (the water treatment module 40A in the example of FIG. 4).

For example, a water treatment module whose item "module identification information (ID)" is "FL02" occupies two slots (the water treatment module 40B in the example of FIG. 4).

The item "data that can be sensed" indicates targets that can be sensed by the water treatment module 40.

(i) The sensing targets include an item that changes before and after water treatment. For example, the sensing targets may include an item sensed for evaluating the performance of purification by water treatment. Specifically, when the water treatment module 40 has a filter or the like to provide the function of obtaining purified water, the sensing target may be the concentration of the substance or microorganism to be removed in the water before treatment by the filter or the like or the concentration in the water after treatment by the filter.

(ii) The sensing targets include an item relating to the amount of water treated.

For example, the amount of water flowing into the water treatment module 40 may be a sensing target.

(iii) The sensing targets include an item for evaluating the function of the water treatment module 40. For example, when the water treatment module 40 provides a power supply, the amount of power generated may be a sensing target. When the water treatment module 40 generates moisture from the air, the amount of water generated may be a sensing target.

Each record of the water treatment apparatus database 282 includes an item "pod identification information (ID)", an item "user identification information (ID)", an item "pod location information", an item "slot usage", an item "designated use", an item "operation start date", and an item "sensing data".

The item "pod identification information (ID)" is information for identifying each water treatment apparatus 30.

The item "user identification information (ID)" is information for identifying each user who uses the water treatment apparatus 30.

The item "pod location information" indicates a location where the water treatment apparatus 30 is installed (for example, information specified by latitude and longitude or information specified by an address). For example, information acquired by the location information sensor 350 of the water treatment apparatus 30 or location information acquired by the user with the terminal apparatus 10 may be used as the location where the water treatment apparatus 30 is installed.

As shown in FIG. 4, the item "slot usage" indicates a status in which a plurality of installation mechanisms (a plurality of slots) of the water treatment apparatus 30 are used by water treatment modules 40. The item "slot usage" may include information on the usage of each of the installation mechanisms (usage of each slot). The item "slot usage" may hold, for example, information for specifying each of the installation mechanisms, information for identifying the type of water treatment module 40 installed in the installation mechanism (module ID), and information on the number of installation mechanisms included in the water treatment apparatus 30. The item "slot usage" may include information on unused installation mechanisms (empty slots).

The item "designated use" indicates the use designated by the user and the usage of each slot for realizing the use in the water treatment apparatus 30. For example, the example shown indicates that four installation mechanisms (slots "SL01", "SL02", "SL03", and "SL04") of the installation mechanisms (slots) included in the water treatment apparatus 30 are used to perform the function of the use "dish-washing" (i.e., using water for washing after meals as the use).

The item "operation start date" indicates when the water treatment apparatus 30 started providing the water treatment function. The item "operation start date" may include information on when (date and time, etc.) the water treatment apparatus 30 started providing the water treatment function with the combination of water treatment modules 40 indicated in the item "slot usage".

The item "sensing data" indicates sensing results of sensing by the water treatment modules 40 installed in the water treatment apparatus 30. In the item "sensing data," information indicating when sensing was performed in each slot and data on the sensing result may be accumulated in association with each other.

Each record of the user information database 283 includes an item "user identification information (ID)", an item "used pod identification information (ID)", an item "owned module", an item "used module", and an item "schedule".

The item "user identification information (ID)" is information for identifying each user who uses the water treatment apparatus 30.

The item "used pod identification information (ID)" indicates information (pod ID) for identifying the water treatment apparatus 30 used by the user.

The item "owned module" indicates information (module ID) for identifying modules held by the user among the water treatment modules 40 that can be installed in the water treatment apparatus 30. That is, the item "owned module" indicates candidate water treatment modules 40 that the user can install in the water treatment apparatus 30. For example, as the user performs an operation for obtaining a water treatment module 40 (such as an operation for purchasing the water treatment module 40), the information on water treatment modules 40 owned by the user is updated in the server 20.

The item "used module" indicates water treatment modules 40 that the user is using by installing them in the water treatment apparatus 30. The item "used module" may be updated by the server 20 acquiring information for identifying the water treatment modules 40 installed in the water treatment apparatus 30. For example, the user may designate the water treatment modules 40 installed in the water treatment apparatus 30 by operating the terminal apparatus 10. The water treatment apparatus 30 may acquire identification information held by a water treatment module 40 by installing the water treatment module 40 in the water treatment module installation mechanism 32 in the water treatment apparatus 30.

The item "schedule" includes user's schedule information. For example, the server 20 acquires user's schedule information from a server apparatus that provides a calendar application. The schedule information includes information on, for example, a subject, a place, a date and time, and a schedule content.

For example, the server 20 may predict the demand for water treatment in the water treatment apparatus 30 based on user's schedule information. For example, based on information on a subject and a place of schedule information, whether or not there is a demand for water and the amount of water demanded at a given date and time may be inferred. For example, when information such as "cooking" is included in the subject, the schedule content, or the like in the schedule information, it can be inferred that there is a demand for water for the use "dishwashing."

Further, the server 20 can compare the user's schedule information with the actual result values of the sensing results in the water treatment apparatus 30 (the item "sensing data" in the water treatment apparatus database 282) to create a trained model for outputting a prediction result of the demand for water treatment based on the schedule information. Based on the trained model and the user's schedule indicated in the item "schedule," the server 20 can infer the demand for water treatment around the date and time indicated in the schedule.

<Operation>

The operation of each apparatus of the water treatment system 1 will be described below.

Specifically, (i) a process of causing the server 20 to accumulate the actual results of water treatment performed by water treatment modules 40 in the water treatment apparatus 30 will be described. In addition, as processing for presenting, to the user, a combination of water treatment modules 40 to be installed in the water treatment apparatus 30, (ii) a process of presenting a combination of water treatment modules 40 in accordance with the use designated by the user, (iii) a process of presenting a combination of water treatment modules 40 to the user by predicting a demand for water treatment at the location where the water treatment apparatus 30 is installed, and (iv) a process of presenting a combination of water treatment modules 40 to the user in accordance with the actual results of water treatment by the water treatment apparatus 30 will be described. In addition, when the water treatment apparatus 30 can be moved, (v) a process of prompting the user to move the water treatment apparatus 30 in accordance with the demands for water treatment in various places will be described.

Figure 8:
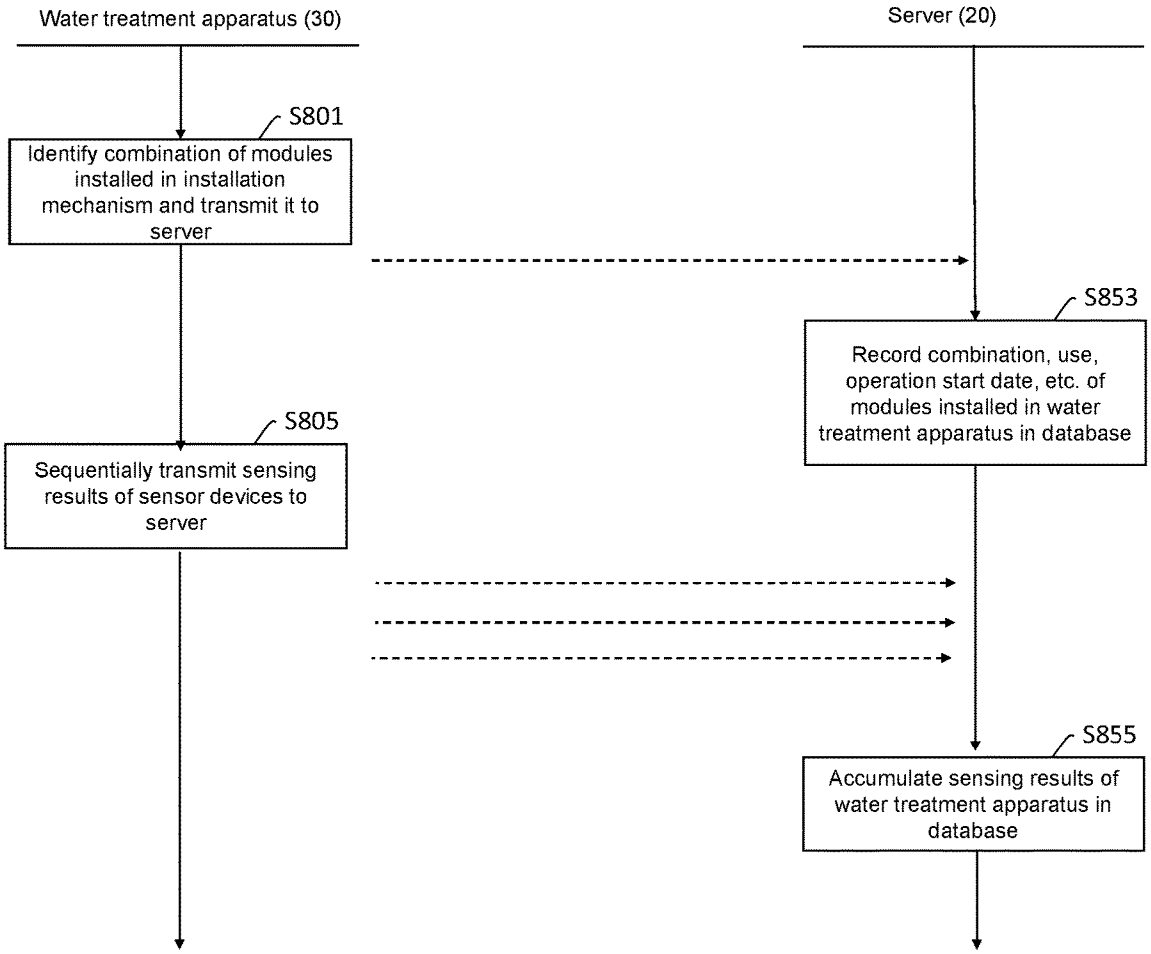
FIG. 8 shows a flow of a process of causing the server 20 to accumulate the actual results of water treatment performed by the water treatment modules 40 in the water treatment apparatus 30.

FIG. 8 shows a flow of a process of causing the server 20 to accumulate the actual results of water treatment performed by the water treatment module 40 in the water treatment apparatus 30.

In step S801, the water treatment apparatus 30 (controller 390) identifies the water treatment module 40 installed in each slot of the water treatment module installation mechanism 32, thereby identifying a combination of water treatment modules 40 installed in the water treatment module installation mechanism 32. The water treatment apparatus 30 transmits the identified combination of water treatment modules 40 to the server 20. In step S853, the server 20 (controller 203) records, in the water treatment apparatus database 282, information such as information for identifying the water treatment apparatus 30, information for identifying the user, information indicating the location of the water treatment apparatus 30, the combination of water treatment modules 40 installed in the slots of the water treatment apparatus 30, the use of the water treatment modules 40, and the operation start date when the water treatment apparatus 30 starts water treatment with the combination of water treatment modules 40 from the water treatment apparatus 30 or the terminal apparatus 10 of the user of the water treatment apparatus 30. Regarding the use of the water treatment modules 40, for example, the user may designate the use of the water treatment apparatus 30 on the terminal apparatus 10 or the water treatment apparatus 30, and the terminal apparatus 10 or the water treatment apparatus 30 may transmit the designated use to the server 20. The operation start date may be designated by the user, or may be identified by the server 20 based on when the terminal apparatus 10 or the water treatment apparatus 30 transmitted the combination of water treatment modules 40 to the server 20 or when the server 20 received the combination of water treatment modules 40.

In step S805, the water treatment apparatus 30 acquires sensing results regarding the treatment of the water treatment modules 40 by various sensor devices, and sequentially transmits the sensing results to the server 20.

In step S855, the server 20 receives the sensing results of the water treatment apparatus 30 from the water treatment apparatus 30 or the terminal apparatus 10, and accumulates the sensing results in the water treatment apparatus database 282.

Figure 9:
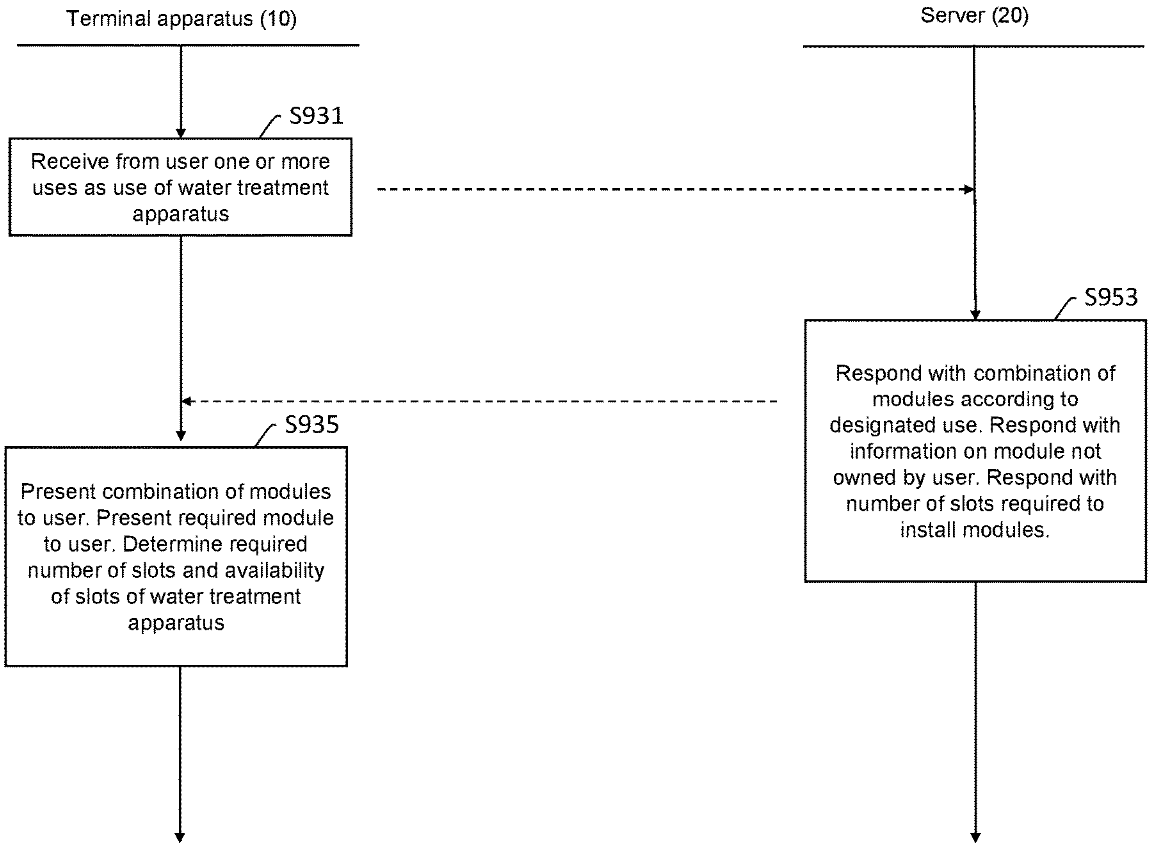
FIG. 9 shows a flow of a process by which the server 20 presents a combination of water treatment modules 40 to a user in accordance with the use of the water treatment apparatus 30 designated by the user.

FIG. 9 shows a flow of a process by which the server 20 presents a combination of water treatment modules 40 to the user in accordance with the use of the water treatment apparatus 30 designated by the user.

In step S931, the terminal apparatus 10 (controller 190) receives, from the user, designation of one or more uses as the use of the water treatment apparatus 30. The terminal apparatus 10 transmits the designated use to the server 20.

In step S953, the server 20 identifies required water treatment modules 40 in accordance with the use of the water treatment apparatus 30 designated by the user by referring to the water treatment module database 281. For example, the server 20 identifies water treatment modules 40 corresponding to the use by holding information in which uses that can be designated by the user are associated with identification information of water treatment modules 40. The server 20 responds to the terminal apparatus 10 with a combination of water treatment modules 40. The server 20 also refers to the user information database 283 and responds with information on a water treatment module 40 not owned by the user among the combination of water treatment modules 40 corresponding to the user's use. In addition, the server 20 responds to the terminal apparatus 10 with the number of slots required for the identified combination of water treatment modules 40.

In step S935, the terminal apparatus 10 presents information indicating the combination of water treatment modules 40 received from the server 20 to the user by displaying the information on the display 132 or the like. When there is a water treatment module 40 that is not owned by the user in the combination of water treatment modules 40, the terminal apparatus 10 presents the water treatment module 40 to the user as a water treatment module 40 required for the use designated by the user. The terminal apparatus 10 determines the number of slots required for the combination of water treatment modules 40 and the availability of slots for water treatment modules 40. For example, when the water treatment apparatus 30 does not have the number of available slots required to realize the use designated by the user, the terminal apparatus 10 notifies the user accordingly.

Figure 10:
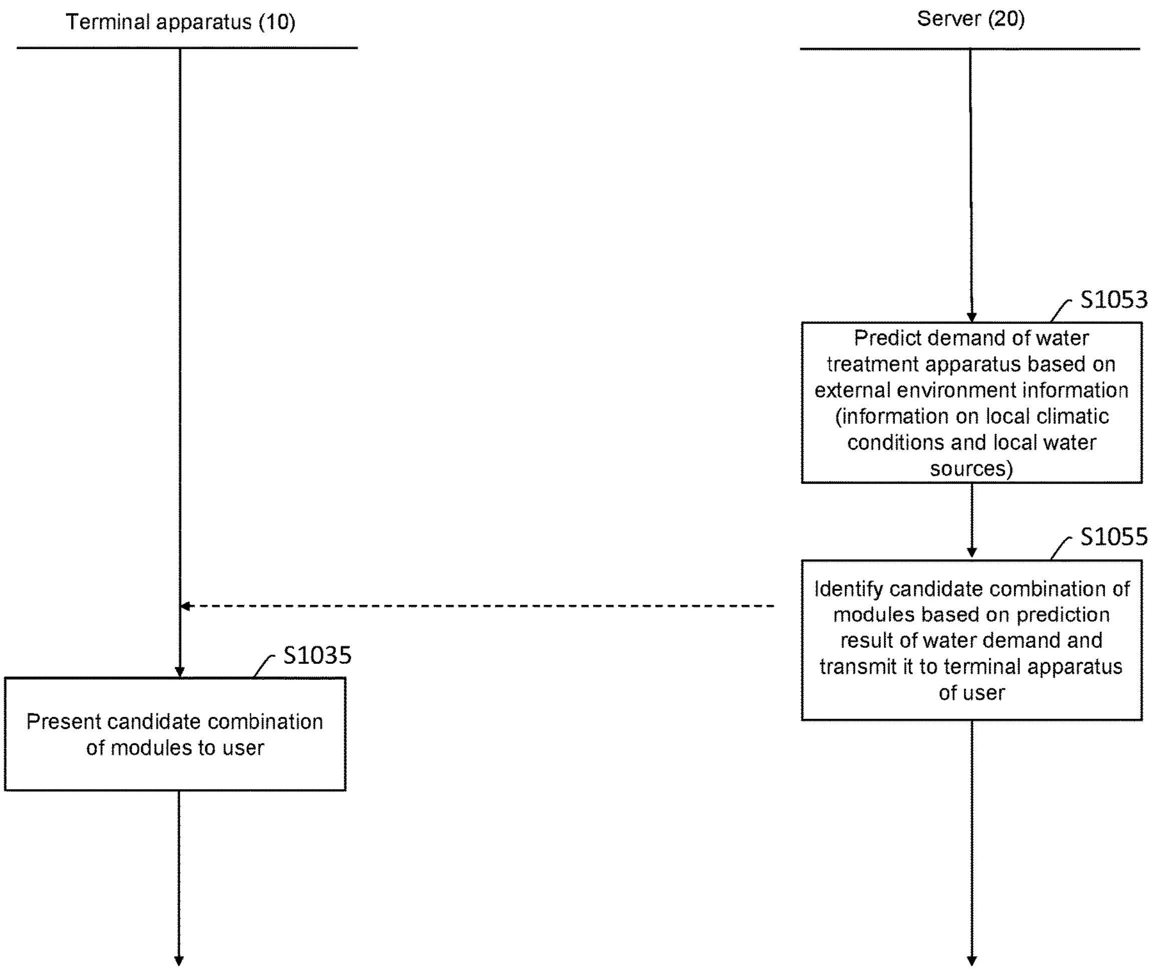
FIG. 10 shows a flow of a process by which the server 20 predicts a demand for water treatment at a location where the water treatment apparatus 30 is installed and presents a combination of water treatment modules 40 to a user.

FIG. 10 shows a flow of a process by which the server 20 predicts a demand for water treatment at the location where the water treatment apparatus 30 is installed and presents a combination of water treatment modules 40 to the user.

In step S1053, the server 20 refers to the external environment information 284 to acquire information on the environment at the location where the water treatment apparatus 30 is installed (such as information on local climatic conditions or information on local water sources). The server 20 predicts the demand for water treatment at the location where the water treatment apparatus 30 is installed, based on the information on the environment.

In step S1055, based on the prediction result of water demand, the server 20 identifies a candidate combination of water treatment modules 40 corresponding to the prediction result, and transmits the identified candidates to the terminal apparatus 10 of the user.

In step S1035, the terminal apparatus 10 receives information on the candidate combination of water treatment modules 40 from the server 20, and presents the received candidate combination of water treatment modules 40 to the user.

This can prompt the user to change the combination of water treatment modules 40 in accordance with the prediction of water demand.

Figure 11:
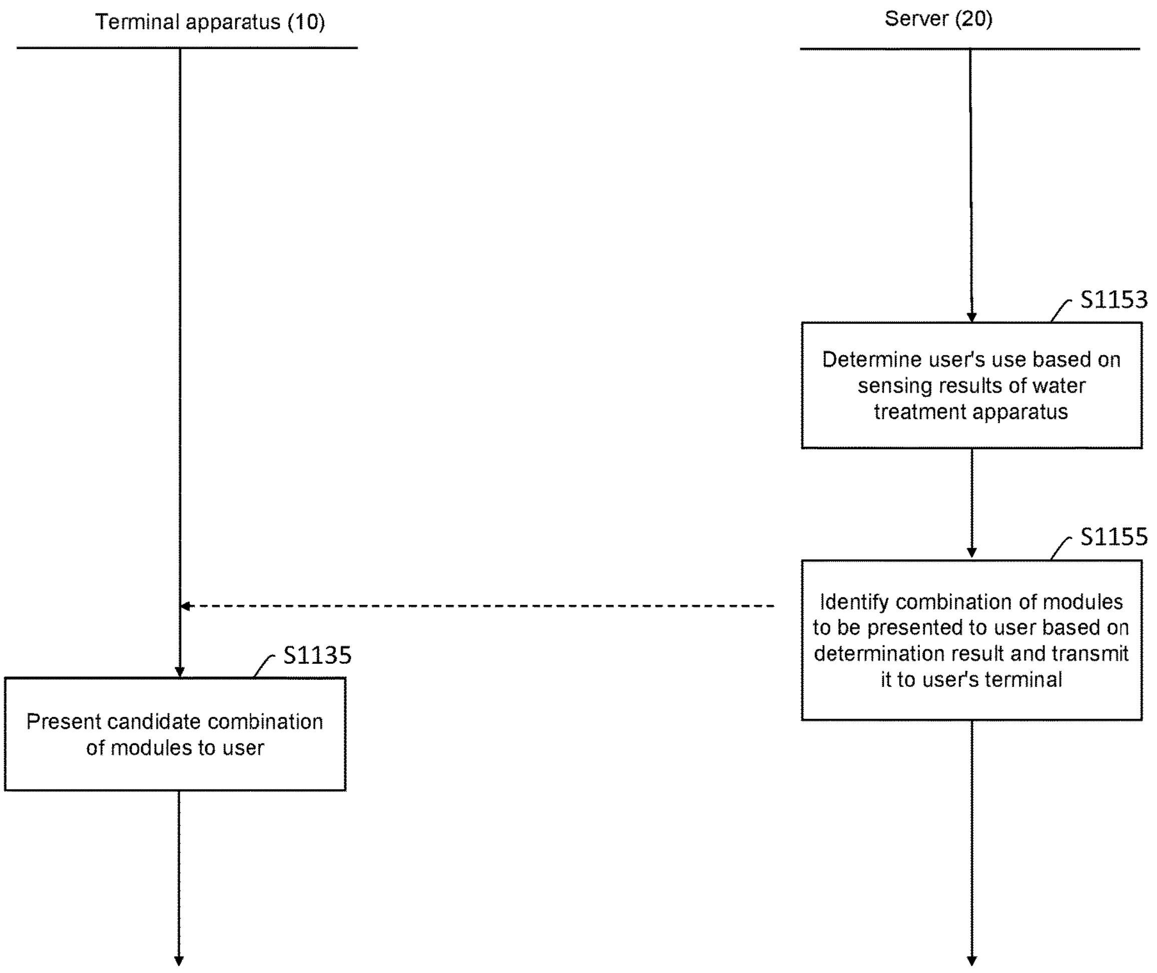
FIG. 11 shows a flow of a process by which the server 20 presents a combination of water treatment modules 40 to a user in accordance with the actual results of water treatment of the water treatment apparatus 30.

FIG. 11 shows a flow of a process by which the server 20 presents a combination of water treatment modules 40 to the user in accordance with the actual results of water treatment of the water treatment apparatus 30.

In step S1153, the server 20 refers to the water treatment apparatus database 282 to determine the use of water treatment of the user based on the sensing results of the water treatment apparatus 30. For example, the server 20 holds information specifying an expected amount of water treated (amount of water flowing into a water treatment module 40) for each use, and determines the use frequency for the use by comparing the sensing result of the water treatment apparatus 30 with the expected amount of water treated. When the use frequency of water treatment for a specific use is lower than a specified value, it can be determined that the user is not using the water treatment apparatus 30 for that use.

When the use frequency of the water treatment apparatus 30 for a specific use is greater than the specified value, it can be determined that the user has a relatively large number of opportunities to use the water treatment apparatus 30 for that use.

When there is a use having a relatively high use frequency among the uses designated by the user, it can be inferred that the user is also using the water treatment apparatus 30 for a use relating to that use. For example, let us assume that, when a water treatment module 40 purifies water by using a filter or the like while the user designating the use "dishwashing", the amount of water actually treated by the water treatment module 40 is larger than the amount of water expected to be treated for the use "dishwashing". In this case, the server 20 can infer that the water treatment module 40 is used for a use other than the use "dishwashing".

In step S1155, the server 20 identifies a combination of water treatment modules 40 to be presented to the user based on the result of determining the use based on the sensing results of the water treatment modules 40, and transmits the identified combination of water treatment modules 40 to the terminal apparatus 10.

In step S1135, the terminal apparatus 10 presents the candidate combination of water treatment modules 40 received from the server 20 to the user.

As described above, it is possible to prompt the user to change the combination of water treatment modules 40 based on the actual results of water treatment in the water treatment apparatus 30.

Figure 12:
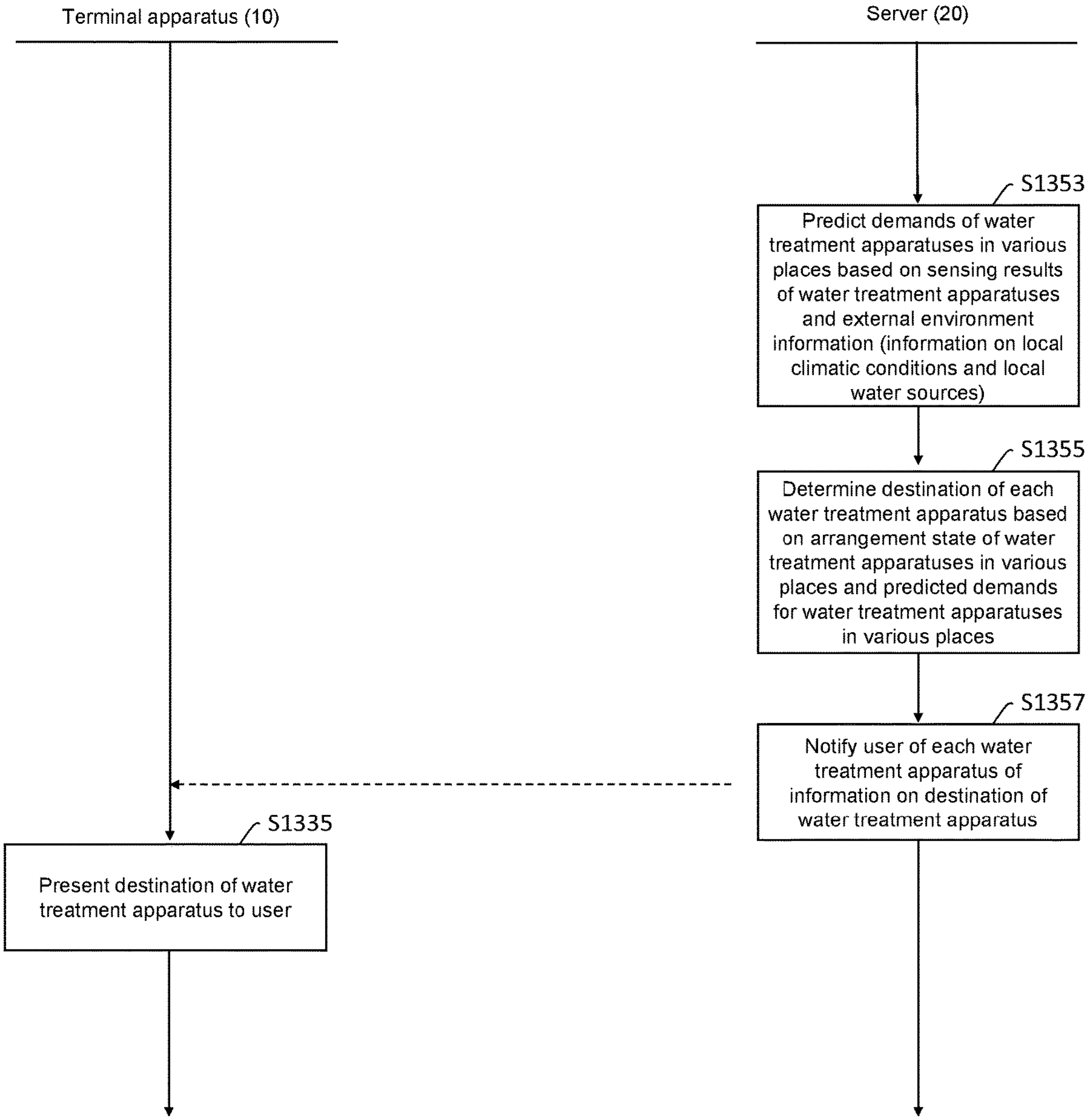
FIG. 12 shows a flow of a process of prompting a user to move the water treatment apparatus 30 in accordance with demands for water treatment in various places.

FIG. 12 shows a flow of a process of prompting the user to move the water treatment apparatus 30 in accordance with the demands for water treatment in various places.

In step S1353, the server 20 refers to the water treatment apparatus database 282 and the external environment information 284 to predict the demands for water treatment in various places based on the sensing results of the water treatment apparatuses 30 installed in various places and the information on the environments of various places. For example, by performing the processes described in steps S1053 and S1153, the server 20 predicts the demands for water treatment in various places and the demands for water treatment apparatuses 30 (such as the number of water treatment apparatuses 30) required to meet the demands.

In step S1355, the server 20 refers to the water treatment apparatus database 282 to acquire a state of arrangement of water treatment apparatuses 30 in various places. The server 20 determines the destination of the water treatment apparatus 30 in each place so that the demands for water treatment in various places predicted in step S1353 can be met. For example, when there is a first area in which the number of water treatment apparatuses 30 is smaller than that of the predicted demands for water treatment in various places, a second area is identified from among a plurality of areas with surplus water treatment apparatuses 30 in comparison to the predicted demands, based on the distance to the first area, the travel time, and the amount of energy required to move water treatment apparatuses 30.

For example, among the areas, a second area with the shortest travel time for moving water treatment apparatuses 30 is identified based on the route to the first area (distance, road congestion, etc.). For example, when the amount of water supplied from tap water or the like is expected to decrease with respect to the water demand, such as when a disaster occurs, a water treatment apparatus 30 may be moved from an area with a short travel time in order to provide the water treatment function of the water treatment apparatus 30 (enable reuse of drain water) in response to the water demand as quickly as possible.

In addition, when the demand for water treatment in each place is expected to change due to a seasonal change or the like, the water treatment apparatus 30 to be moved may be identified so that the amount of energy required to move the water treatment apparatus 30 becomes small (so that the amount of energy required for transportation becomes small).

In step S1357, the server 20 notifies the user of each water treatment apparatus 30 of information on the destination of the water treatment apparatus 30.

In step S1335, the terminal apparatus 10 presents the destination of the water treatment apparatus 30 to the user.

The water treatment apparatus 30 does not necessarily need to be associated with information on a user who uses the water treatment apparatus 30. For example, the water treatment apparatus 30 may be installed in a public facility, a highly public place (such as a park), and may not be associated with user information or may be associated with administrator information. The water treatment apparatus 30 may be caused to travel from the first area to the second area by its own by remote control through communication or by automatic travel based on map information or the like.

<Screen Example>

A screen example in a situation in which the user is notified of information or the like will be described. As described above, information is presented to the user by the terminal apparatus 10 or the water treatment apparatus 30. In the following description of the screen example, an example in which information is presented by the terminal apparatus 10 of the user will be described.

FIG. 13 shows a screen example on the terminal apparatus 10.

Figure 13A:
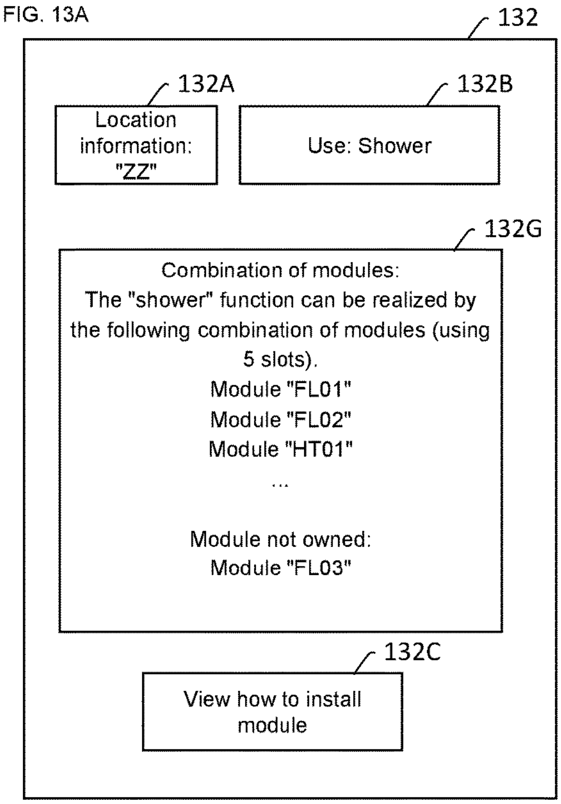
FIG. 13A shows a screen example on the terminal apparatus 10.
Figure 13B:
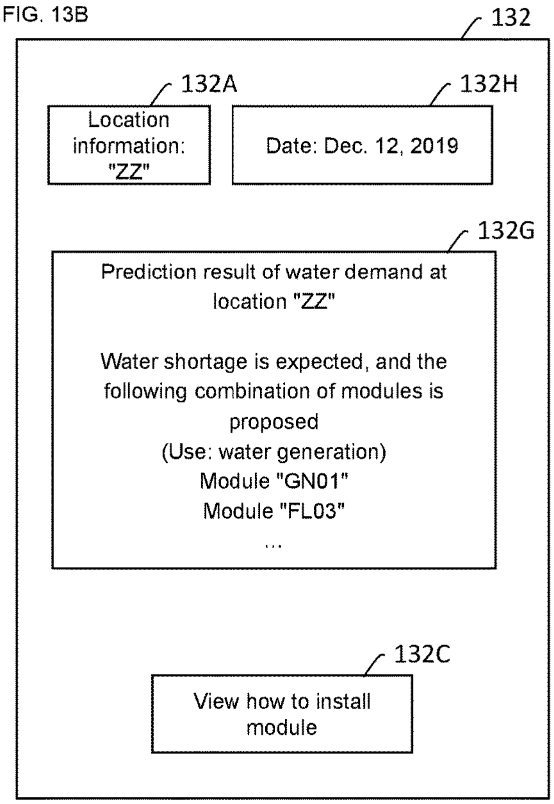
FIG. 13B shows a screen example on the terminal apparatus 10.
Figure 13C:
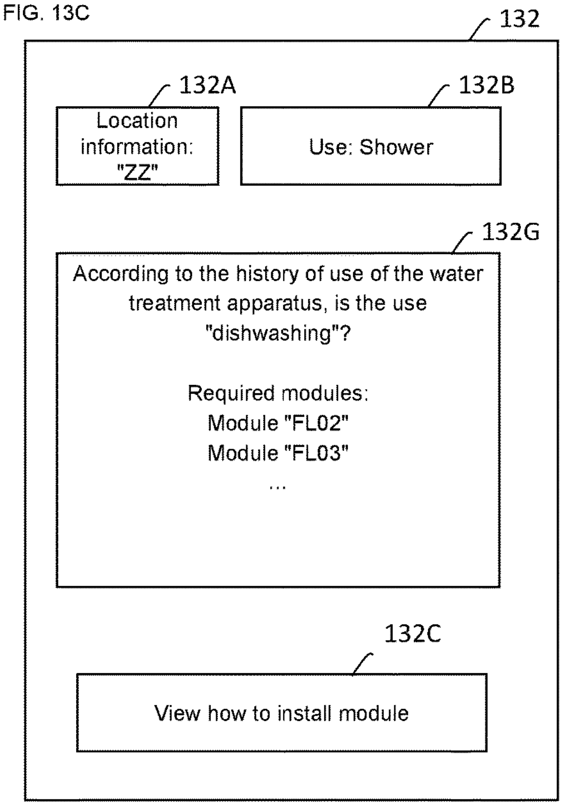
FIG. 13C shows a screen example on the terminal apparatus 10.

FIGS. 13A, 13B, and 13C show screen examples in a situation in which a combination of water treatment modules 40 corresponding to the use of the water treatment apparatus 30 is presented to the user.

FIG. 13A corresponds to the processes of steps S931 and S935. As shown in FIG. 13A, the terminal apparatus 10 displays a location display section 132A, a use display section 132B, a module information display section 132G, and an operation button 132C on the display 132. The server 20 refers to the water treatment apparatus database 282 to transmit, to the terminal apparatus 10, information to be displayed on the terminal apparatus 10.

The location display section 132A is an area for presenting to the user a location where the water treatment apparatus 30 is installed.

The use display section 132B is an area for presenting to the user a use set for the water treatment apparatus 30 (for example, a use designated by the user).

The module information display section 132G is an area for presenting to the user a combination of water treatment modules 40 to be installed in the water treatment apparatus 30. As shown in the module information display section 132G, the terminal apparatus 10 displays a combination of modules required for the water treatment apparatus 30 to perform the function of the use "shower" and a water treatment module 40 not owned by the user (water treatment module 40 required for the user to be provided with the function corresponding to the use by the water treatment apparatus 30).

The operation button 132C is an area for displaying information for guiding the user on how to install a water treatment module 40 in the water treatment apparatus 30. For example, the terminal apparatus 10 displays, in response to a user's operation to designate the operation button 132C, the position, etc. of a slot for installing each water treatment module 40 displayed in the module information display section 132G in the water treatment apparatus 30.

FIG. 13B corresponds to the process of step S1035. As shown in FIG. 13B, the terminal apparatus 10 displays a prediction result of the water demand at the location where the water treatment apparatus 30 is installed according to the prediction results of water demands in various places and a combination of water treatment modules 40 that can be suitable for the water demand according to the prediction result, as shown in the module information display section 132G and time display section 132H. For example, when a shortage of water supply with respect to the demand for water is predicted, the server 20 causes the terminal apparatus 10 to display a combination of water treatment modules 40 so that the shortage can be resolved.

FIG. 13C corresponds to the process of step S1135. As shown in FIG. 13C, the terminal apparatus 10 displays the result of estimating the user's use based on the history of the user using the water treatment apparatus 30, as shown in the module information display section 132G. In the module information display section 132G, the terminal apparatus 10 displays a combination of water treatment modules 40 corresponding to the estimated user's use.

The terminal apparatus 10 may display, on the screen (screen that displays a water treatment module 40 not owned by the user), a screen (or a button for transitioning to the screen) for enabling the user to use the water treatment module 40 not owned by the user by purchasing or the like.

Figure 13D:
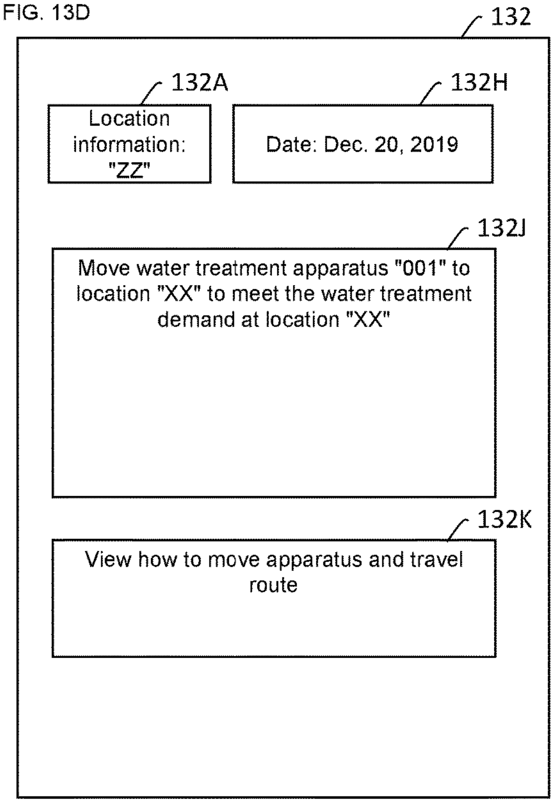
FIG. 13D shows a screen example on the terminal apparatus 10.

FIG. 13D shows a situation in which a guide to move the water treatment apparatus 30 in accordance with the demands for water in various places is presented to the user.

FIG. 13D corresponds to the process of step S1335. As shown in FIG. 13D, the terminal apparatus 10 displays location display section 132A, time display section 132H, a guide display section 132J and a route display section 132K on the display 132.

The water treatment apparatus 30 may not be owned by the user, and the water treatment apparatus 30 installed in each place may be moved by automatic travel or transportation in accordance with the prediction results of the demands for water treatment.

Alternatively, FIG. 13D may be a screen to be presented to an administrator who manages the water treatment apparatus 30.

The guide display section 132J is an area for displaying a destination when the water treatment apparatus 30 is moved in accordance with the prediction results of the demands for water treatment in various places. The guide display section 132J may display information on the time required to move the water treatment apparatus 30 or the time at which the water treatment apparatus 30 should be moved.

The route display section 132K is an area for the user to view how to move the water treatment apparatus 30 from the current place to the destination and the travel route. For example, in response to a user's operation on the route display section 132K, the screen may transition to a screen displaying how to move the apparatus and the like, or information such as a travel route may be displayed on the route display section 132K.

As described above, the water treatment system 1 is configured so that the combination of water treatment modules 40 can be changed in accordance with the use in the water treatment apparatus 30 installed in each place, and can respond to a wide variety of demands for water without requiring infrastructure costs like large-scale water treatment equipment.

Second Embodiment

A water treatment system according to another embodiment will be described below. In the description of the second embodiment, the term "water treatment apparatus" encompasses the "water treatment apparatus 30" described in the first embodiment, and refers to an apparatus that performs water treatment such as removal of foreign matter from water supplied to the environment or from used water by means of a filter. In other words, the "water treatment apparatus" encompasses apparatuses that perform water treatment other than the water treatment apparatus 30. In the description of the second embodiment, the term "water use facility" refers to a facility installed in response to a situation in which a user uses water.

In the description of the second embodiment, when various water use facilities and water treatment apparatuses (including the water treatment apparatus 30 described in the first embodiment; in other words, water treatment apparatuses other than the water treatment apparatus 30 are also installed in a house or the like) can be used in various environments such as a house, collective housing, and a mobile body (such as a camper or a flying body), a method for creating a trained model for predicting the water demand and water usage in each environment will be described. The environment in which water is used includes an outdoor land 5, a building with an indoor space 6, and a mobile body 7, as described in the first embodiment.

The second embodiment also describes distributing a created trained model to a water treatment apparatus or a user's terminal (including the terminal apparatus 10 described in the first embodiment), thereby enabling various processes such as notification of information to the user and maintenance and management of the water treatment apparatus.

Figure 14:
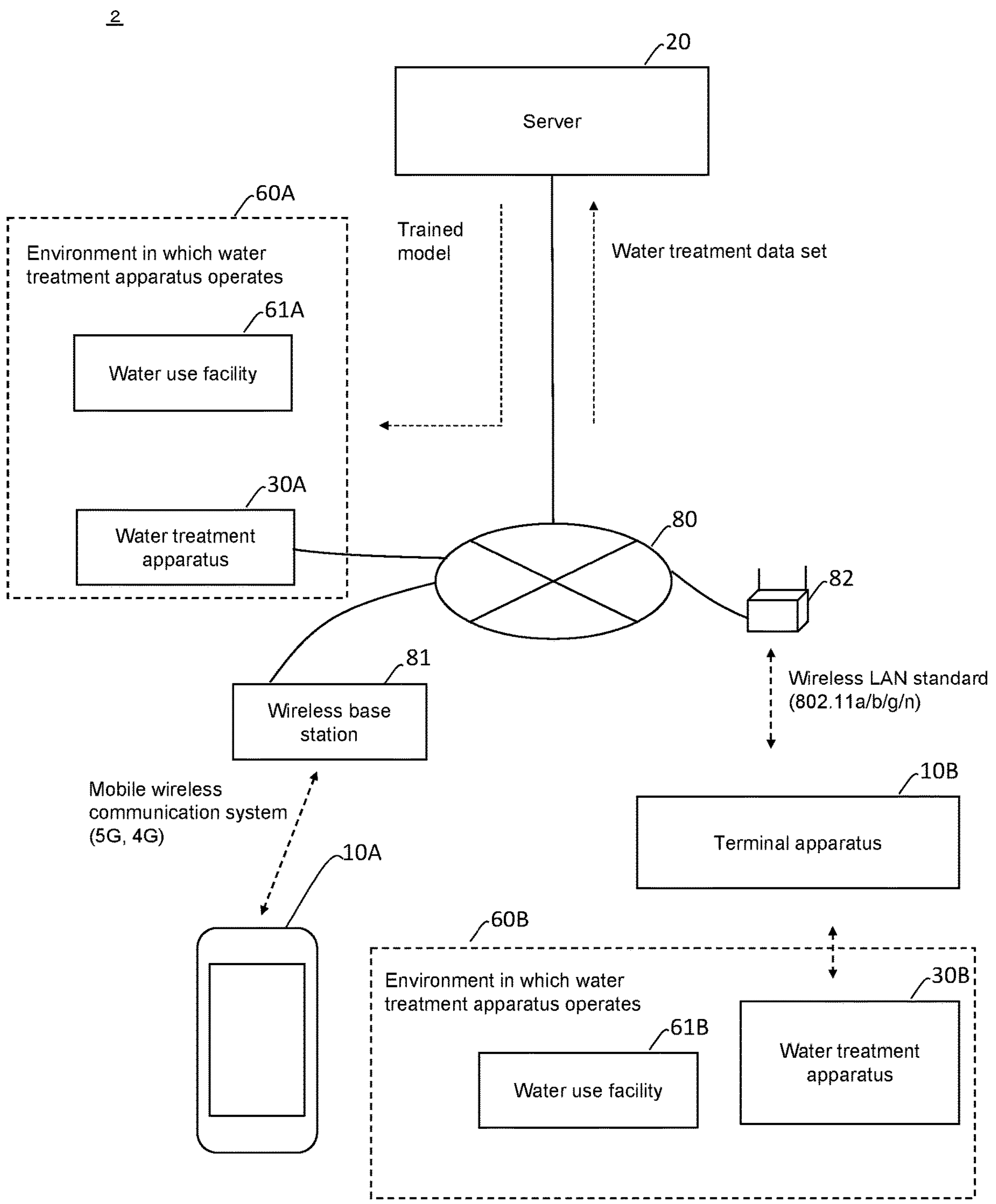
FIG. 14 shows an overview of a water treatment system 2 according to a second embodiment.

FIG. 14 shows an overview of a water treatment system 2 according to the second embodiment. As shown in the water treatment system 2, the server 20 receives and accumulates a water treatment data set, which is a data group output in conjunction with water treatment from various devices, such as water treatment apparatuses (including the water treatment apparatuses 30), water use facilities, and terminal apparatuses 10, arranged in respective environments. For example, the server 20 receives, as the water treatment data set, sensing data sensed at water use facilities (61A, 61B, . . . ) installed in environments (60A, 60B) in which water treatment apparatuses (including water treatment apparatuses other than the water treatment apparatus 30) operate, and various data sensed in conjunction with the operation of the water treatment apparatuses (for example, water treatment apparatuses 30A, 30B). The water use facility is a facility for a user to use water; for example, various water use facilities, such as a shower room, a kitchen, and a laundry, are available depending on the situation in which the user uses water. For example, various sensors may be provided in various water treatment modules installed in the water treatment apparatus 30.

Here, the water treatment data set includes, for example, the following:

(a) Parameters for driving various types of hardware constituting the water treatment system 2
- Parameters relating to driving pumps of water use facilities and water treatment apparatuses
  - (1) Pump drive value (voltage, current), accumulated drive time, and pump maintenance records
  - (2) Service life of pump
- Parameters relating to operation control of tank
  - (1) Tank capacity, material, and service life
  - (2) Variation in tank capacity
  - (3) Tank accumulated drive time and maintenance records
- Parameters relating to valve operation control
  - (1) Valve drive value (voltage, current), accumulated drive time, operating time/timing
  - (2) Service life of valve (b) Sensing results
- Sensing results of various sensors capable of sensing water (for example, the following items can be sensed by the sensors)
  - (1) Flow rate, pressure, water level, and temperature
  - (2) pH, electric conductivity, redox potential, alkalinity, and ion concentration
  - (3) Turbidity, chromaticity, viscosity, and dissolved oxygen
  - (4) Odor, ammonia nitrogen, nitrate nitrogen, nitrite nitrogen, total nitrogen, residual chlorine, total phosphorus, total organic carbon, total inorganic carbon, and total trihalomethane
  - (5) Detection result of microbial sensor, chemical oxygen demand, and biological oxygen demand
  - (6) Cyanogen, mercury, oil, and surfactant
  - (7) Detection result of optical sensor, and detection result of total dissolved solids (TDS) sensor
  - (8) Mass spectrometry result, fine particles, zeta potential, surface potential
- Sensing results of gas sensor (for example, the following items can be sensed by the sensor)
  - (1) Carbon monoxide, carbon dioxide, ammonia, methane, propane, propane alcohol, volatile organic compounds (VOC), organic solvents, trimethylamine, methyl mercaptan, hydrogen sulfide, methyl sulfide, methyl disulfide, oxygen, nitrogen, chlorine, and flammable gases
- Image data
  - (1) Monitoring image data of biological treatment tank
  - (2) Monitoring image data of tank
  - (3) Monitoring image data of filter
  - (4) Monitoring image data of piping
- Water quality data
  - (1) Data on water quality standard items (51 items, Ministry of Health, Labor, and Welfare) of water quality standards
  - (2) Sewage treatment data (c) Other information
- Environmental information
  - (1) Atmospheric pressure, temperature, and humidity
  - (2) Information indicating location of environment
- User data
  - (1) Attributes of user (gender, nationality, residence)
  - (2) User's usage (washing use, drinking use)

The server 20 generates a trained model based on a water treatment data set collected from an environment (60A, 60B) in which a water treatment apparatus operates. For example, the server 20 generates trained models by performing machine learning based on water treatment data sets accumulated by sensing in the respective environments (60A, 60B) in which the water treatment apparatuses operate. The server 20 may store trained models in association with information specifying respective environments (60A, 60B) in which the water treatment apparatuses operate.

The server 20 transmits the generated trained model to a computer such as the water treatment apparatus 30 or the terminal apparatus 10. Based on the information specifying the environment in which the water treatment apparatus operates, the server 20 transmits the trained model based on the water treatment data set obtained by sensing in the environment to the water treatment apparatus 30 or the user's terminal apparatus 10 associated with the information specifying the environment. As a result, the server 20 can distribute the trained models to the water treatment apparatuses 30 or the terminal apparatuses 10 for the respective environments (60A, 60B) in which water treatment apparatuses operate.

Here, as a mode of installation, one or more water use facilities and water treatment apparatuses may be installed in a single house, or a water use facility and a water treatment apparatus may be installed in collective housing. Alternatively, a water use facility and a water treatment apparatus may be installed at a campsite, a travel destination, a temporary place to stay, and the like. Alternatively, a water use facility and a water treatment apparatus may be installed in a commercial facility such as a restaurant. The water use facility is installed in correspondence with a situation in which a user uses water, which includes, for example, the following situations.

The situations in which a user uses water include (a) a situation in which a user uses body washing equipment. Places where body washing equipment is arranged include a shower room, a bathroom, a hand washing area, a foot washing area, an animal body washing area, and the like.

The situations in which a user uses water include (b) a situation in which a user uses equipment for washing clothes. Equipment for washing cloths includes a washing machine and the like.

The situations in which a user uses water include (c) a situation in which a user uses food and dish washing equipment, which is used, for example, in a kitchen.

The situations in which a user uses water include (d) a situation in which a user uses water supply equipment. For example, a user uses a water purifier to obtain drinking or cooking water.

These water use facilities have piping, a faucet, and the like for supplying and draining water, and the amount of water used or the like is recorded. In addition, the water use facilities may use naturally collected water (river, swamp, lake, sea water, well water, rain water), or may use treated water that has been treated by a water treatment apparatus.

By providing a water treatment apparatus with a filter, the water treatment apparatus can remove foreign matter having a predetermined size or more and foreign matter having a predetermined length or more. For example, the water treatment apparatus removes waste, stones, soil, sand, hair, grime, excrement, food, and the like by the filter.

By providing a water treatment apparatus with a reverse osmosis membrane, the water treatment apparatus can remove metal molecules and pesticide molecules.

By being operated under computer control, these water treatment apparatuses (including the water treatment apparatus 30) can control the flow rate of water to be treated by the water treatment apparatus and the content of treatment on water (which filter water passes through).

For example, by controlling the operation of valves of the water treatment apparatus by a computer, it is possible to control the water to be treated as to which filter provided in the water treatment apparatus to pass through. For example, by controlling valves, the water to be treated can be controlled to pass through one filter, a plurality of filters, or none of the filters.

For example, by controlling the operation of the pump of the water treatment apparatus by a computer, it is possible to control the amount and pressure of water delivered by the pump.

Further, by providing a water treatment facility or a water treatment apparatus with various sensors, the water treatment facility or the water treatment apparatus can sense the change in water pressure and the amount of water. Examples of the sensors include a pressure sensor, a flow rate sensor, an electric conductivity sensor, and an odor sensor. By providing a pressure sensor in piping used in a water treatment facility or a water treatment apparatus, the pressure of water in the piping can be sensed. In addition, by providing a flow rate sensor and an odor sensor in piping or the like through which post-treatment water after treatment by the water treatment apparatus flows, the amount of water treated by the water treatment apparatus and the intensity of the odor can be sensed. For example, an electric conductivity sensor can sense the electric conductivity of pre-treatment water before treatment by the water treatment apparatus.

Such a sensor is installed, for example, in piping, a faucet, or the like.

<Data Structure>

FIG. 15 shows a data structure of external environment information 284 in the second embodiment.

As shown in FIG. 15, each record of the external environment information 284 includes information on items such as an item "environment identification information (ID)", an item "parameters affecting demand for water in environment", and an item "sensing data of water treatment facility".

The item "environment identification information (ID)" is information for identifying each environment in which the water treatment apparatus operates. The environment in which the water treatment apparatus operates is, for example, a house occupied by one or more households, a building used as a place of business, a facility in which a plurality of houses or places of business are clustered, or the like. The item "environment identification information (ID)" may include information on the location of the environment in which the water treatment apparatus operates.

The item "parameters affecting demand for water in environment" is parameters relating to the amount of water supplied and the amount of water demanded in the environment.

For example, regarding the parameters relating to the amount of water supplied and the amount of water demanded, factors based on the environment include the place and location where water is used, the situation in which water is used, temperature, humidity, vibration, atmospheric pressure, and the like. In addition, regarding the parameters, factors based on the mode of use include the method of using water, the use, and the like. Regarding the parameters, time factors include the frequency with which users use water, the time for which users use water per use, and the like. Specifically, the parameters may include the following.

(i) Parameters affecting the motivation of consumers to use water include, for example, parameters of climatic conditions. Parameters of climatic conditions include weather, air temperature, humidity, wind velocity, and the like in the environment (location) where the water treatment apparatus is installed.

(ii) Parameters affecting the amount of water demanded include, for example, information on users who use water in the environment. For example, parameters affecting the amount of water demanded include information on the number of users who use water in the environment and information on the number of people flowing in and out per unit time. Further, parameters affecting the amount of water demanded may include information on a time period during which a person stays in a house or the like.

(iii) Parameters relating to the amount of water supplied to the environment include, for example, information on water sources available in the environment. For example, the information on water sources may include information on the flow rate of a river, the amount of groundwater, water quality, and the like.

The item "sensing data of water use facility" includes data that can be sensed in the environments (60A, 60B) in which water treatment apparatuses operate. For example, when various sensors (a gas sensor and the like) are installed in an environment, the item includes sensing results of the sensors. The item also includes information on the operation status of the water use facilities (tanks, etc.) installed in the environments (60A, 60B) under computer control. The item also includes information on water quality sensed by various sensors included in the water use facility or the water treatment apparatus.

As described above, the server 20 can generate trained models by accumulating, in the external environment information 284 or the like, water treatment data sets acquired in the environments (60A, 60B) in which water treatment apparatuses operate, and performing machine learning based on the water treatment data sets. As the machine learning method, various methods such as deep learning can be used.

Figure 16:
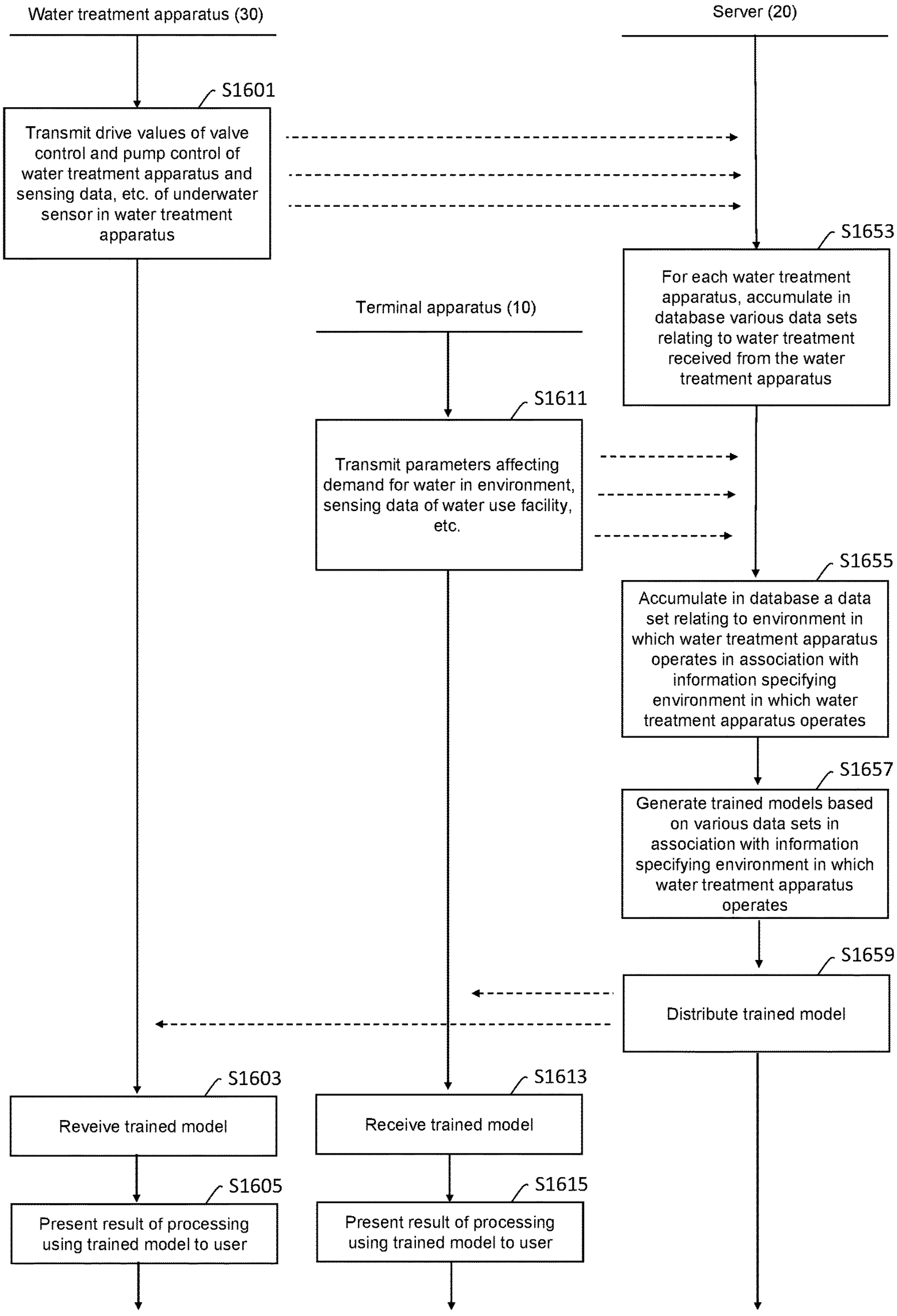
FIG. 16 shows an operation of each apparatus constituting the water treatment system 2 of the second embodiment.

FIG. 16 shows an operation of each apparatus constituting the water treatment system 2 of the second embodiment. As an example of the water treatment apparatus, the water treatment apparatus 30 described in the first embodiment is shown; however, the water treatment apparatus is not limited thereto.

In step S1601, the water treatment apparatus 30 transmits parameters for controlling the operation of the water treatment apparatus 30 (such as drive values of valve control and pump control of the water treatment apparatus 30) and sensing data of various sensors (such as an underwater sensor) of the water treatment apparatus 30 to the server 20 as a water treatment data set.

In step S1653, for the water treatment apparatus 30 in each environment, the server 20 receives a water treatment data set from the water treatment apparatus 30. The server 20 accumulates the received water treatment data set in the water treatment apparatus database 282 in association with information specifying the corresponding water treatment apparatus 30.

In step S1611, the terminal apparatus 10 transmits data acquired in each environment to the server 20 as a water treatment data set. The terminal apparatus 10 transmits, for example, parameters affecting the demand for water in each environment, sensing data of the water use facility, and the like to the server 20.

In step S1655, the server 20 acquires data acquired in each environment from the terminal apparatus 10 (or a computer other than the terminal apparatus 10 in the environment) and accumulates the data in a database (such as the external environment information 284) as a water treatment data set. The server 20 accumulates the water treatment data set as a database in association with information specifying the environment in which the water treatment apparatus operates (such as information for identifying the user who uses the environment, identification information of the water treatment apparatus 30, or information on the location where the water treatment apparatus 30 is arranged).

In step S1657, the server 20 generates a trained model for each environment based on the water treatment data set acquired in the environment. The server 20 generates trained models based on various water treatment data sets in association with information specifying the environment in which the water treatment apparatus 30 operates.

In step S1659, the server 20 transmits a trained model to a computer in each environment. The server 20 distributes a trained model generated for each environment to the terminal apparatus 10 or water treatment apparatus 30 of the environment based on information specifying the environment.

In step S1603, the water treatment apparatus 30 receives the trained model from the server 20.

In step S1605, the water treatment apparatus 30 presents a result of processing using the trained model to the user.

In step S1613, the terminal apparatus 10 receives the trained model.

In step S1615, the terminal apparatus 10 presents a result of processing using the trained model to the user.

In the description of the second embodiment, an example has been described in which a trained model generated by the server 20 is distributed to the terminal apparatus 10 or the water treatment apparatus 30, and the terminal apparatus 10 or the water treatment apparatus 30 receives the trained model and presents a result of processing based on the trained model to the user (S1605, S1615).

Alternatively, the server 20 may hold a trained model generated for each environment in advance, perform processing based on the trained model in response to access from the terminal apparatus 10 or the water treatment apparatus 30 in the environment, and transmit a result of the processing to the terminal apparatus 10 or the water treatment apparatus 30. That is, the server 20 may perform the processes of steps S1605 and S1615, and transmit a result of processing based on the trained model to the water treatment apparatus 30 or the terminal apparatus 10 in response to access from the water treatment apparatus 30 or the terminal apparatus 10.

By each apparatus of the water treatment system 2 performing processing as described above, a trained model can be distributed to each household, for example. This enables performing processing based on a water demand prediction and presenting a result of the processing to the user.

For example, presenting a result of processing using a trained model to the user (S1605, S1615) includes the following.

(1) Processing Relating to Water Supply

For example, when the amount of water supplied to an environment may change, it is possible to prompt adjustment of the amount of water used in the environment and how to perform water treatment in the water treatment apparatus. When water from a water source is shared by several people, the time and amount of water used may vary among environments (for example, households). While predicting the demand for water in accordance with changes in weather conditions and the inflow and outflow of people (which are estimated based on the number of users of the airport, the number of hotel reservations, and the like in the case of tourist spots), control can be performed, such as reusing water that has been treated by the water treatment apparatus in each environment, so that the amount of water supplied from the water source does not become insufficient, based on the trained model generated for the environment.

(2) Estimation of Functions Required for Water Treatment

For example, the terminal apparatus 10 uses the trained model to predict, based on pump drive value information and other information (for example, weather information), the operation state of the pump of the water treatment apparatus when the other information changes. For example, the terminal apparatus 10 uses the trained model to obtain a forecast of weather information such as temperature, humidity, and wind velocity, and estimate the demand for water in the case of weather information indicated in the forecast based on the predicted operation state of the pump. By using the trained model, the terminal device 10 can estimate the demand for water and estimate the functions required for the water treatment apparatus 30 (such as a combination of water treatment modules 40 to be mounted on the water treatment apparatus 30, a filter, pump performance, and piping specifications that can cope with the predicted amount of water treatment) in accordance with the demand for water.

Further, since the pump controls the flow rate and water pressure of water allowed to pass through the filter provided in the water treatment apparatus, the terminal apparatus 10 can present a prediction result of electricity charges to the user, present the time to replace the filter, perform processing of placing an order for replacement of the filter based on the inventory status of the filter, and the like by using the trained model.

(3) how to Handle Post-Treatment Water

The terminal apparatus 10 uses the trained model to predict the properties of post-treatment water which has been treated by the water treatment apparatus and determine the content of notification to the user in accordance with the prediction result. For example, the terminal apparatus 10 predicts the properties of water after treatment by the water treatment apparatus by predicting the sensing results of various sensors on post-treatment water which has been treated by the water treatment apparatus when the sensing results on pre-treatment water which flows into the water treatment apparatus change. For example, the terminal apparatus 10 or the like can determine whether or not post-treatment water can flow into a river or soil as it is, based on the properties of the water (such as the degree of removal of contaminants).

<Another Example of Configuration of Water Treatment Apparatus 30>

As described above with reference to FIG. 4, in the water treatment apparatus 30 described in the first and second embodiments, a water treatment module 40 having a predetermined shape is inserted into the water treatment module installation mechanism 32 (installation mechanisms 32A, 32B, . . . (slots 32A, 32B, . . . )).

Alternatively, a method of connecting a plurality of water treatment modules 40 to each other, a method of connecting a water treatment module 40 to a mechanism for supplying water to be treated, and a method of connecting a draining mechanism for draining post-treatment water to a water treatment module 40 may be as follows, for example.

FIG. 17 shows another example of the configuration of the water treatment apparatus 30. As shown in the figure, a plurality of water treatment modules 40 may be arranged side by side and connected to each other by piping 42. Alternatively, a plurality of water treatment modules 40 may be connected to each other by arranging them side by side or stacking them or the like by providing, at a predetermined place on the exterior of a water treatment module 40, a connection mechanism 43 for connecting to another water treatment module 40.

Figure 17A:
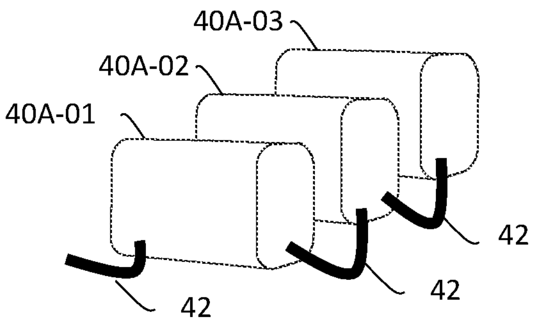
FIG. 17A shows another example of the configuration of the water treatment apparatus 30.

FIG. 17A shows an example in which a plurality of water treatment modules 40 are arranged side by side horizontally and connected by the piping 42. For example, the water treatment modules 40 are arranged side by side on a floor surface, and the piping 42 is connected to the water treatment modules 40. As shown in the figure, a water treatment module 40A-01 is connected to a water treatment module 40A-02 by the piping 42. The water treatment module 40A-02 is also connected to a water treatment module 40A-03 by the piping 42.

The piping 42 may have a structure in which water to be treated flows in a branching manner, and the branching direction may be controlled by a valve.

Figure 17B:
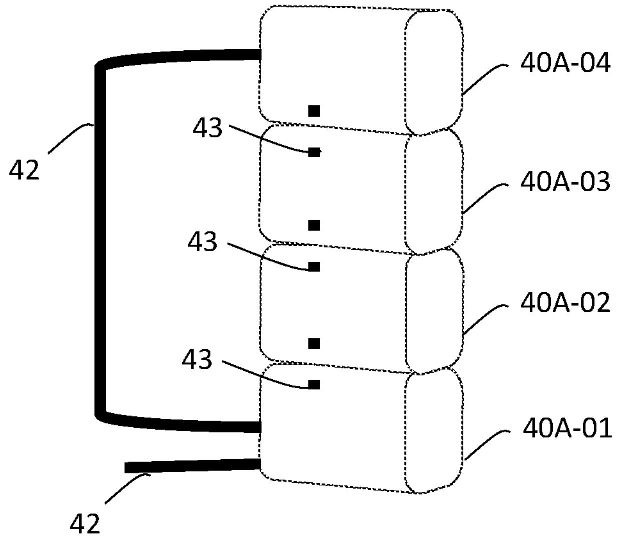
FIG. 17B shows another example of the configuration of the water treatment apparatus 30.

FIG. 17B shows an example in which water treatment modules 40 are connected to each other by mechanisms provided in the water treatment modules 40. For example, a water treatment module 40 is provided with a mechanism for connecting to another water treatment module 40 at any surface such as a side surface. For example, water treatment modules 40 may have a concave portion and a convex portion and may be combined with each other by fitting the convex portion into the concave portion.

In the example of FIG. 17B, a plurality of water treatment modules 40 are stacked to be connected to each other. In the example of FIG. 17B, a water treatment module 40A-01 is connected to a water treatment module 40A-02 by a connection mechanism 43 (indicated by a dotted line). Similarly, the water treatment module 40A-02 is connected to a water treatment module 40A-03, and the water treatment module 40A-03 is connected to a water treatment module 40A-04 by connection mechanisms 43.

As described above, both when a water treatment module 40 is inserted into the water treatment module installation mechanism 32 as shown in FIG. 4 and when a plurality of water treatment modules 40 are connected to each other as shown in FIG. 17, water passing through the water treatment module installation mechanism 32, the piping 42, the connection mechanism 43, and the filter provided in the water treatment module 40, and the like can be sensed by various sensor devices. The server 20 updates the water treatment apparatus database 282 based on the sensing results of the water treatment apparatus 30.

APPENDIXES

The matters described in the above embodiments will be added below.

(Appendix 1) A water treatment apparatus (30) comprising: a water receiver (36) configured to receive an input of water; and an installation mechanism (32) configured to include one or more slots in which a module (40) for water treatment is installable, wherein among a plurality of types of modules (281) available to be selected in accordance with a use of water treatment, at least one module includes a filter as a component, and the water treatment apparatus is configured to provide a water treatment function corresponding to the module to the water received at the water receiver by installing the module in one of the one or more slots.

(Appendix 2) The water treatment apparatus according to (Appendix 1), wherein each of the plurality of types of modules (40A, 40B, 40C, . . . ) has a predetermined size or structure, and each of the one or more slots has a shape corresponding to the size or structure of the module (32A, 32B, 32C, . . . ).

(Appendix 3) The water treatment apparatus according to (Appendix 1), further comprising a discharge unit (37) configured to discharge treated water which has been treated by the module installed in the installation mechanism, wherein the water receiver receives, as the input, drain water after the discharged treated water has been used by a user.

(Appendix 4) The water treatment apparatus according to (Appendix 1), wherein the plurality of types of modules include at least one of a module having a function of purifying water by a filter, a module having a function of supplying electric power, a module having a function of generating water from air, or a module having a function of heating or cooling water (281).

(Appendix 5) The water treatment apparatus according to (Appendix 1), further comprising: a sensor (32) configured to measure water purification status of the water received at the water receiver or of treated water treated by the module installed in the installation mechanism; and a transmission unit (390, 311, 321, 312, 322) configured to transmit a sensing result of the sensor to an external computer apparatus.

(Appendix 6) The water treatment apparatus according to (Appendix 5), wherein the external computer apparatus includes a processing circuitry (203) and a storage (202), and the processing circuitry causes the storage to store the sensing result received from the water treatment apparatus (282), identifies a combination of modules to be installed in the water treatment apparatus among the plurality of types of modules, based on the sensing result of the sensor (2045), and notifies a user of the water treatment apparatus of the identified combination of modules (201, 2043, S1155).

(Appendix 7) A computer apparatus (10, 20) communicating with a water treatment apparatus used by a user, wherein the water treatment apparatus (30) includes: a water receiver (36) configured to receive an input of water; and an installation mechanism (32) configured to include one or more slots in which a module for water treatment is installable, among a plurality of types of modules (281) available to be selected in accordance with a use of water treatment, at least one module includes a filter as a component, and the water treatment apparatus is configured to provide a water treatment function corresponding to the module to the water received at the water receiver by installing the module in one of the one or more slots, the computer apparatus comprising processing circuitry configured to: acquire information indicating a use of water by a user (282, S853, S953); identify a combination of modules corresponding to the use among the modules based on the acquired information (2045, S953); and notify the user of the identified combination of the modules (S953).

(Appendix 8) The computer apparatus according to (Appendix 7), further comprising: a storage configured to store information specifying each of the modules and a function of the module in association with each other (281), wherein in the identifying a combination of the modules, the processing circuitry identifies a function of the module required by the user in accordance with the acquired use of the water and identifies the combination of modules based on the identified function (2045, S953).

The invention claimed is:

1. A water treatment system comprising a water treatment apparatus and a computer apparatus, wherein the water treatment apparatus comprises:

a first plurality of sensors configured to measure a water quality of water input into the water treatment apparatus, wherein the first plurality of sensors is configured to measure at least a first flow rate, water temperature, pH, alkalinity, and dissolved solids;

an installation mechanism configured to include one or more slots in which a module for water treatment is installable, wherein, among a plurality of types of modules available to be selected in accordance with a use of water treatment, at least one module includes a filter as a component, and the water treatment apparatus is configured to provide a water treatment function corresponding to the module to the water input into the water treatment apparatus by installing the module in one of the one or more slots;

a second plurality of sensors configured to measure a water treatment status of treated water treated by the module installed in the installation mechanism, wherein the second plurality of sensors is configured to measure at least a second flow rate;

a transmitter configured to transmit sensing results measured by the first plurality of sensors and the second plurality of sensors to the computer apparatus that comprises a processor and a memory, wherein the processor is configured to:

cause the memory to store the sensing results received from the water treatment apparatus, identify a combination of modules to be installed in the water treatment apparatus among the plurality of types of modules based on the sensing results of the first plurality of sensors, acquire schedule information of a usage type for water and an amount of water used;

compare the schedule information with water usage data based on results from the second plurality of sensors;

predict an amount of water and an operation state of a pump of the water treatment apparatus using a machine learning model, wherein the machine learning model is trained using water treatment data collected from operation of the water treatment system, the water treatment data includes pump drive value information and weather information, the weather information including at least one of temperature, humidity, or wind velocity, and the machine learning model is configured to predict the amount of water and the operation state of the pump based on the pump drive value information, the weather information, a location of the water treatment system and the comparison between the schedule information and the water usage data, select at least one of the plurality of types of modules for water treatment for installation into the installation mechanism based on the amount of water;

present a time to replace a filter included in the at least one of the plurality of types of modules for water treatment based on the operation state of the pump;

and perform water treatment using the at least one of the plurality of types of modules for water treatment.

2. The water treatment system according to claim 1, wherein each of the plurality of types of modules has a predetermined size or structure, and each of the one or more slots has a shape corresponding to the predetermined size or structure of the plurality of types of modules.

3. The water treatment system according to claim 1, wherein the plurality of types of modules comprise:

a module configured to purify water by a filter,
a module configured to supply electric power,
a module configured to generate water from air, and
a module configured to heat or cool the water.

4. The water treatment system according to claim 1, wherein the water treatment system comprises a plurality of water treatment apparatuses.

5. The water treatment system according to claim 1, wherein the computer apparatus notifies a user of the water treatment apparatus of the at least one of the plurality of types of modules.

6. The water treatment system according to claim 1, wherein the processor is further configured to estimate functions required for the water treatment function based on the amount of water and the operation state of the pump.

7. The water treatment system according to claim 1, wherein the dissolved solids includes at least one of microbes or turbidity.

8. The water treatment system according to claim 1, wherein the schedule information is acquired from a calendar application and includes a date and time associated with a scheduled event.

9. The water treatment system according to claim 1, wherein the machine learning model is trained by comparing the schedule information with actual result values of the sensing results from the second plurality of sensors.

* * * * *